United States Patent
Stewart et al.

(10) Patent No.: US 9,556,856 B2
(45) Date of Patent: Jan. 31, 2017

(54) GEOTHERMAL ENERGY SYSTEM AND METHOD OF OPERATION

(75) Inventors: James J. Stewart, The Hague (NL); Dmitriy I. Zaynulin, London (GB); Anthony C. Scott, Forsand (NO); Grahame Newton, AC de Zilk (NL)

(73) Assignee: GREENFIELD MASTER IPCO LIMITED, St. Helier, NJ (US)

( * ) Notice: Subject to any disclaimer, the term of this patent is extended or adjusted under 35 U.S.C. 154(b) by 658 days.

(21) Appl. No.: 12/452,559

(22) PCT Filed: Jul. 3, 2008

(86) PCT No.: PCT/GB2008/002274
§ 371 (c)(1),
(2), (4) Date: Jun. 7, 2010

(87) PCT Pub. No.: WO2009/007684
PCT Pub. Date: Jan. 15, 2009

(65) Prior Publication Data
US 2010/0288465 A1    Nov. 18, 2010

(30) Foreign Application Priority Data
Jul. 6, 2007    (GB) .................................. 0713177.4

(51) Int. Cl.
*G01K 13/00*    (2006.01)
*F24J 3/08*    (2006.01)
(Continued)

(52) U.S. Cl.
CPC .................. *F03G 7/04* (2013.01); *F24J 3/086* (2013.01); *F24J 2003/089* (2013.01);
(Continued)

(58) Field of Classification Search
CPC ...................................... F24J 3/08; F03G 7/00
(Continued)

(56) References Cited

U.S. PATENT DOCUMENTS 2,461,449 A    2/1949    Smith el al.
2,637,531 A    5/1953    Davidson
(Continued)

FOREIGN PATENT DOCUMENTS

CH    649623 A5    5/1985
CN    1 731 041 B    2/2006
(Continued)

OTHER PUBLICATIONS

International Search Report and Written Opinion of the International Searching Authority for PCT/GB2008/002274, date of mailing Oct. 16, 2008.
(Continued)

*Primary Examiner* — Lisa Caputo
*Assistant Examiner* — Nasir U Ahmed
(74) *Attorney, Agent, or Firm* — Hamilton, Brook, Smith & Reynolds, P.C.

(57) ABSTRACT

A geothermal energy system comprising a plurality of borehole heat exchangers, each borehole heat exchanger containing a working fluid and comprising an elongate tube having a closed bottom end and first and second adjacent elongate conduits interconnected at the bottom end, a manifold for the working fluid to which the plurality of borehole heat exchangers is connected, and a plurality of valves connected between the plurality of borehole heat exchangers and the manifold, whereby the first and second conduits of the plurality of borehole heat exchangers are selectively connectable to the manifold by operation of the valves.

37 Claims, 14 Drawing Sheets

(51) Int. Cl.
*F03G 7/04* (2006.01)
*F28F 13/12* (2006.01)

(52) U.S. Cl.
CPC .............. *F28F 13/12* (2013.01); *Y02B 10/40* (2013.01); *Y02E 10/16* (2013.01)

(58) Field of Classification Search
USPC ................................. 62/260, 324.1; 374/136
See application file for complete search history.

(56) References Cited

U.S. PATENT DOCUMENTS

| | | | |
|---|---|---|---|
| 3,168,337 A | 2/1965 | Johnson et al. | |
| 3,986,362 A | 10/1976 | Baciu | |
| 4,022,025 A | 5/1977 | Greene | |
| 4,044,830 A * | 8/1977 | Van Huisen | 166/267 |
| 4,062,489 A | 12/1977 | Henderson | |
| 4,134,462 A | 1/1979 | Clay | |
| 4,165,619 A | 8/1979 | Girard | |
| 4,392,531 A * | 7/1983 | Ippolito | 166/278 |
| 4,444,249 A | 4/1984 | Cady | |
| 4,538,673 A | 9/1985 | Partin et al. | |
| 4,657,076 A | 4/1987 | Tsutsumi et al. | |
| 4,693,089 A | 9/1987 | Bourne et al. | |
| 4,711,094 A | 12/1987 | Ares et al. | |
| 5,081,848 A | 1/1992 | Rawlings | |
| 5,224,357 A | 7/1993 | Galiyano et al. | |
| 5,244,037 A | 9/1993 | Warnke | |
| 5,272,879 A | 12/1993 | Wiggs | |
| 5,339,890 A * | 8/1994 | Rawlings | F24J 3/084 165/142 |
| 5,372,016 A | 12/1994 | Rawlings | |
| 5,390,748 A * | 2/1995 | Goldman | 175/24 |
| 5,394,950 A * | 3/1995 | Gardes | 175/45 |
| 5,461,876 A | 10/1995 | Dressler | |
| 5,477,703 A * | 12/1995 | Hanchar et al. | 62/260 |
| 5,477,914 A | 12/1995 | Rawlings | |
| 5,477,915 A | 12/1995 | Park | |
| 5,495,723 A | 3/1996 | MacDonald | |
| 5,548,957 A * | 8/1996 | Salemie | 60/641.8 |
| 5,704,656 A * | 1/1998 | Rowe | 285/93 |
| 5,822,990 A | 10/1998 | Kalina et al. | |
| 5,875,644 A | 3/1999 | Ambs et al. | |
| 5,992,507 A * | 11/1999 | Peterson et al. | 165/45 |
| 6,158,466 A | 12/2000 | Riefler | |
| 6,220,339 B1 * | 4/2001 | Krecke | 165/48.2 |
| 6,250,371 B1 * | 6/2001 | Amerman et al. | 165/45 |
| 6,688,129 B2 * | 2/2004 | Ace | 62/260 |
| 6,775,996 B2 * | 8/2004 | Cowans | 62/160 |
| 6,848,506 B1 * | 2/2005 | Sharp et al. | 166/301 |
| 7,028,478 B2 * | 4/2006 | Prentice, III | 60/645 |
| 7,178,337 B2 * | 2/2007 | Pflanz | 60/641.2 |
| 7,228,696 B2 | 6/2007 | Ambs | |
| 7,264,067 B2 * | 9/2007 | Glaser et al. | 175/61 |
| 7,407,003 B2 * | 8/2008 | Ross | 165/295 |
| 7,571,762 B2 | 8/2009 | Ross | |
| 7,647,773 B1 * | 1/2010 | Koenig | 60/641.2 |
| 9,360,236 B2 | 6/2016 | Stewart et al. | |
| 2003/0024685 A1 | 2/2003 | Ace | |
| 2003/0221436 A1 | 12/2003 | Xu | |
| 2004/0168460 A1 | 9/2004 | Briley | |
| 2004/0206085 A1 * | 10/2004 | Koenig et al. | 60/641.1 |
| 2005/0006049 A1 * | 1/2005 | Ross | 165/45 |
| 2005/0061472 A1 * | 3/2005 | Guynn et al. | 165/45 |
| 2006/0064281 A1 | 3/2006 | Nagano et al. | |
| 2006/0101820 A1 * | 5/2006 | Koenig et al. | 60/641.2 |
| 2006/0168979 A1 | 8/2006 | Kattner et al. | |
| 2007/0023163 A1 * | 2/2007 | Kidwell | F24J 3/084 165/45 |
| 2007/0044494 A1 | 3/2007 | Ally et al. | |
| 2007/0209380 A1 | 9/2007 | Mueller | |
| 2009/0084518 A1 * | 4/2009 | Panula et al. | 165/45 |
| 2011/0100586 A1 | 5/2011 | Yang | |
| 2011/0146317 A1 | 6/2011 | Cline et al. | |
| 2011/0197599 A1 * | 8/2011 | Stewart et al. | 62/56 |
| 2011/0265989 A1 | 11/2011 | Alexandersson | |
| 2011/0272117 A1 * | 11/2011 | Hamstra | F24D 12/02 165/45 |
| 2012/0090807 A1 | 4/2012 | Stewart et al. | |
| 2013/0037236 A1 | 2/2013 | Saunier et al. | |
| 2014/0150475 A1 | 6/2014 | Zaynulin et al. | |
| 2014/0299291 A1 | 10/2014 | Stewart et al. | |

FOREIGN PATENT DOCUMENTS

| | | | |
|---|---|---|---|
| CN | 1854649 A | 11/2006 | |
| DE | 27 31 178 A1 | 1/1979 | |
| DE | 2850865 A1 | 6/1980 | |
| DE | 29 19 855 A1 | 11/1980 | |
| DE | 3018337 | 11/1980 | |
| DE | 8032916.4 | 12/1980 | |
| DE | 29 28 893 A1 | 1/1981 | |
| DE | 3009572 A1 | 9/1981 | |
| DE | 3048870 | 7/1982 | |
| DE | 3114262 | 11/1982 | |
| DE | 31 48 600 A2 | 7/1983 | |
| DE | 3600230 A1 | 7/1987 | |
| DE | 37 35 808 A1 | 5/1988 | |
| DE | 19728637 | 3/1999 | |
| DE | 203 03 484 U1 | 7/2004 | |
| DE | 102009023142 A1 | 12/2010 | |
| EP | 0070583 | 1/1983 | |
| EP | 1048820 | 11/2000 | |
| EP | 1808570 | 7/2007 | |
| EP | 2 290 304 A1 | 3/2011 | |
| EP | 2385328 A2 | 11/2011 | |
| FR | 2456919 A | 12/1980 | |
| FR | 2817024 | 5/2002 | |
| GB | 1496075 A | 12/1977 | |
| GB | 2045909 A * | 11/1980 | F24F 3/02 |
| GB | 2434200 A | 7/2007 | |
| GB | 2450754 B | 1/2012 | |
| GB | 2482435 B | 3/2012 | |
| GB | 2482436 B | 3/2012 | |
| JP | 50022949 A | 3/1975 | |
| JP | 57058024 | 4/1982 | |
| JP | 62000741 A | 1/1987 | |
| JP | 55134264 A | 10/1989 | |
| JP | H08506652 | 7/1996 | |
| JP | 09060985 A | 3/1997 | |
| JP | 2001-183030 A | 7/2001 | |
| JP | 2005-098594 A | 4/2005 | |
| JP | 2006-118851 A | 5/2006 | |
| JP | 2006258406 A | 9/2006 | |
| JP | 2006-292310 A | 10/2006 | |
| JP | 2007024342 A | 2/2007 | |
| JP | 2008-292044 A | 12/2008 | |
| JP | 2009287912 A | 12/2009 | |
| WO | WO 82/02935 A | 9/1982 | |
| WO | WO 83/01272 | 4/1983 | |
| WO | WO 83/01272 A | 4/1983 | |
| WO | WO 94/18510 A1 | 8/1994 | |
| WO | WO 01/42721 A | 6/2001 | |
| WO | WO 01/42721 A2 | 6/2001 | |
| WO | WO 0142721 A2 * | 6/2001 | F24J 3/08 |
| WO | WO 03/069240 A | 8/2003 | |
| WO | WO 2007/097701 A | 8/2007 | |
| WO | WO 2008/034970 A1 | 3/2008 | |
| WO | WO 2009/006794 A1 | 1/2009 | |
| WO | WO 2009/007683 A1 | 1/2009 | |
| WO | WO 2009/007684 A1 | 1/2009 | |
| WO | WO 2010/053424 A1 | 5/2010 | |
| WO | WO 2011/017450 A2 | 2/2011 | |

OTHER PUBLICATIONS

Great Britain Search Report for GB 0713177.4, date of search Sep. 10, 2007.
International Search Report and Written Opinion of the International Searching Authority for PCT/GB2008/002269, date of mailing Oct. 16, 2008.
Great Britain Search Report for GB 0713178.2, date of search Feb. 26, 2008.

(56) References Cited

OTHER PUBLICATIONS

Great Britain Examination Report for GB0713177.4, dated Sep. 28, 2010.
International Search Report and Written Opinion of the International Searching Authority for PCT/EP2012/054044, entitled: Thermal Energy System and Method of Operation, date of mailing Jan. 17, 2013.
Combined Search and Examination Report for GB 1103916.1, dated Jul. 8, 2011.
Great Britain Search Report for GB0811013.2 Dated Aug. 8, 2008.
Great Britain Search Report for GB0811013.2 Dated Dec. 18, 2008.
International Search Report and the Written Opinion, International Application No. PCT/EP2012/072332, entitled: Orienting and Supporting a Casing of a Coaxial Geothermal Borehole, Date of Mailing: Jul. 3, 2013.
Combined Search and Examination Report for GB 1119470.1, Dated Mar. 13, 2012.
Combined Search and Examination Report for GB 1215986.9, Dated Sep. 21, 2012.
Combined Search and Examination Report in GB 1218685.4, Dated Nov. 6, 2012.
International Preliminary Report and Written Opinion, International Application No. PCT/EP2012/072332, entitled: Orienting and Supporting a Casing of a Coaxial Geothermal Borehole, Date of Mailing: May 13, 2014.

* cited by examiner

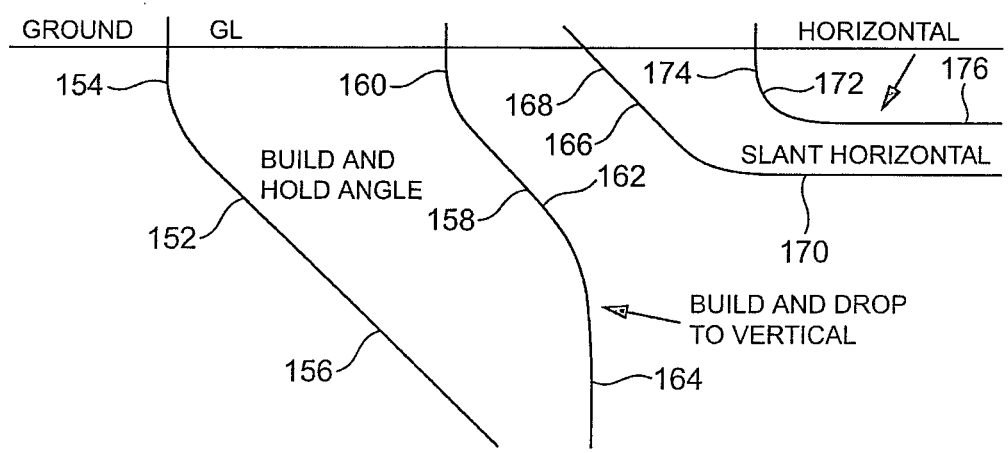
FIG. 10
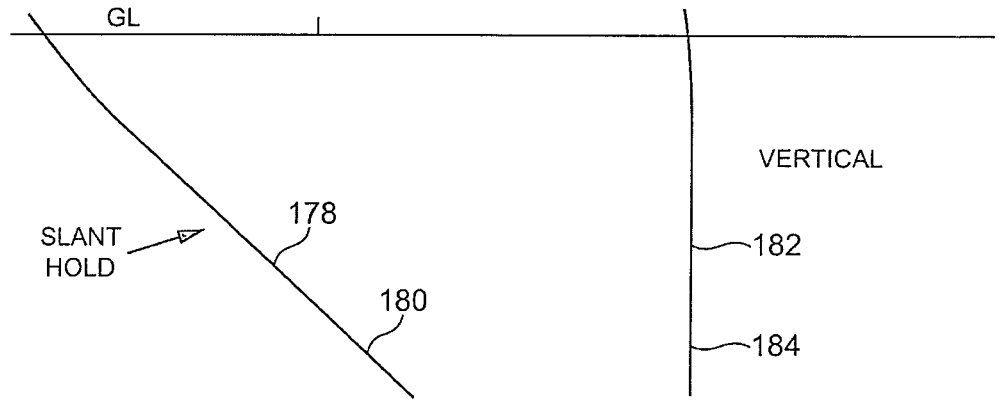
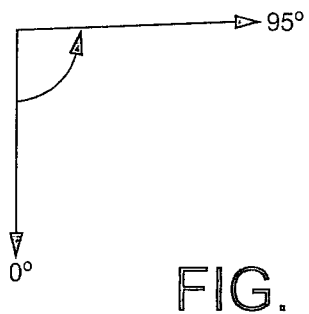
FIG. 11

SQUARE
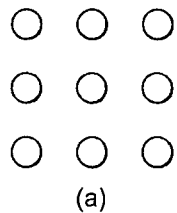
(a)
CROSS
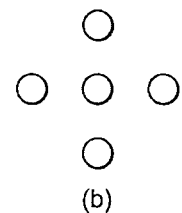
(b)
LINE
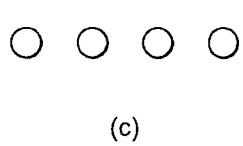
(c)
ARC
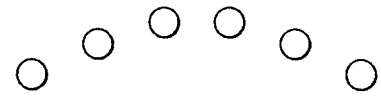
(d)
RECTANGLE
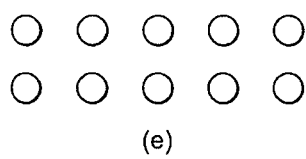
(e)
CIRCLE
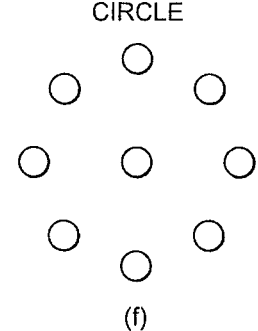
(f)
FIG. 13

GEOTHERMAL ENERGY SYSTEM AND METHOD OF OPERATION

This application is the U.S. National Stage of International Application No. PCT/GB2008/002274, filed Jul. 3, 2008, which designates the U.S., published in English, and claims priority under 35 U.S.C. §§119 or 365(c) to Great Britain Application No. 0713177.4, filed Jul. 6, 2007.

The present invention relates to a geothermal energy system and to a method of operating a geothermal energy system.

Geothermal energy has been exploited around the globe in various forms for power generation and direct heating for more than a century. Typically these installations have been located in areas of volcanic activity where high enthalpy source rocks are located relatively close to or at the Earth's surface e.g. Western USA, Iceland or Philippines. Less well known, but of increasing importance, has been the development in recent decades of low enthalpy geothermal resources through, for example, the application of low temperature turbo-generators and through the use of ground source heat pumps (GSHP) for heating, cooling and thermal energy storage.

The basic principle involved is the use of the stable thermal conditions existing in the ground formations below approximately 10 meters below surface. This stability derives from the mass of the Earth and the geothermal heat flux that originates in the molten core of the Earth. This heat flux is for all practical purposes renewable and limitless since the molten core of the Earth is sustained by nuclear decay. Under controlled conditions, the ground formations can supply, absorb or store large quantities of thermal energy by means of tubular heat exchangers inserted into the ground and coupled to a heat pump (single-acting or reversible configuration) at surface utilising a working fluid as the heat transfer medium.

It is known to extract low temperature geothermal energy for heating a building by means of an installation of one or more borehole heat exchangers (BHE), each installed in the ground, combined with a heat pump (HP). The system applies a reversible refrigeration cycle that operates between the ground and the building's inner space. A variety of specialist arrangements are known that may employ a working fluid in a closed or open circuit. Such systems and methods are known in the art as comprising "Ground Source Heat Pump (GSHP)" technology.

Geothermal energy systems have been in use for a number of years. There were close to 2 million installations worldwide by 2006, primarily to service small domestic dwellings.

Apart from basic refinement of the heat pump and associated heating/cooling energy supply and management systems, much research has been devoted in the last 25 years to the design and operation of the borehole heat exchangers (BHE) required to serve these systems. The BHE is a critical component of a GSHP installation since its construction cost and thermal efficiency have a major impact on the economic performance of the installation. Several basic types of BHE have been developed over this period, including both horizontal and vertical designs working in open loop or closed loop mode.

Open loop systems typically depend upon the extraction of groundwater from the source be it subsurface aquifer or a lake or river and then passing the water through the heat pump. Subsequently, the water is either disposed of at surface or re-injected back to the aquifer through a dedicated secondary borehole located some distance from the extraction borehole. While these systems are inherently highly efficient in terms of thermal energy transfer, extensive measures have to be taken to minimise corrosion and maintenance costs. Also because they are extracting groundwater and then depositing it into the local environment, they are typically subject to very stringent environmental planning controls.

For this reason, closed loop systems are preferred.

Typical horizontal BHE designs utilise a closed loop made up from coils of small diameter plastic pipe (so-called "Slinkies") buried in long trenches about 1 meter below the surface. Low cost has been the driver here and where the required land area is available, reasonable thermal efficiency can be achieved, measured by the ratio of peak power transfer capability per linear meter of trench. Slinkies typically perform in the range of 20-70 W/m.

However, there some limitations, most notably when the required land area is not available, which is very often the case, particularly where large capacity systems are prescribed.

Also, being only a meter or so below the surface, a horizontal BHE is sensitive to surface climate conditions that may give rise to performance degradation, particularly when used to reject heat from building cooling systems in the summer. Slinky systems do, however, have a particular application in the case where the thermal resource is a body of water such as a lake or river.

Advantageously, a vertical BHE requires very little surface area for both construction access and final installation. In North America and also extensively in Europe, vertical BHEs comprising a U-tube installed and usually grouted in a borehole ranging in depth from 10's to 100's of meters, have emerged as the most favoured choice, principally for reasons of construction simplicity and relatively low cost. The thermal performance of these BHEs is comparable with that of a well designed Slinky system, with power transfer figures again in the range of 20-70 W/m.

Although benefiting from the greater thermal stability of a borehole, the limiting factor in this design is its relatively high thermal resistance resulting from the poor thermal conductivity of the grouting used both outside and inside the outer casing, the small surface area of the U-tube and the separation between the borehole wall and the U-tube.

Variations on the U-tube design include double U-tubes and "Standing column" arrangements in which the U-tube(s) is suspended in the borehole which is allowed to fill with groundwater rather than being filled with grouting. The standing column design is less costly to construct and tends to greater efficiency than a grouted U-tube but is essentially limited to areas where impermeable hard rock ground formations exist e.g. Scandinavia for reasons of borehole stability and environmental regulations.

Due to their obvious simplicity, U-tube designs have been widely accepted as the norm in the GSHP industry for many years now. In consequence, the bulk of the research and development has been focused on U-tube designs with a plethora of dedicated software and hardware now widely and inexpensively available to system designers and planners.

Another realisation of the vertical BHE is known variously as the "Co-axial" or "Concentric" configuration. In its basic form this is a tube-in-tube arrangement comprising an outer cylindrical casing that is used to line and support the borehole wall and within which is installed a matching tubing of smaller diameter that is suspended so as to locate its open end a short distance above the bottom of the borehole.

Ideally, although not always the case, the inner tube is centralised in the bore of the outer casing so as to facilitate optimisation of the thermal and hydraulic flows in the BHE. The closed loop is then formed by water circulation either down the inner tube and back up the annulus between the inner tube and outer casing or the reverse depending upon the design considerations. The heat transfer is by conduction to the flow of water in the annulus and the efficiency benefits from the larger effective contact area of the water with the ground formations offered by the outer casing, providing the hydraulic conditions are optimised.

The co-axial configuration has not found widespread acceptance to date in the GSHP industry. The reasons for this include higher capital cost and the perception of complexity relative to the U-tube design. Historically, the limited number of co-axial installations has been exclusively carried out by oil and gas and water well drilling contractors with little awareness of the GSHP market, inappropriate price structures and lack of innovation.

Consequently, relatively little research and development on co-axial systems has been carried out in support of the GSHP industry in the past. However, this situation is now changing, with a drive towards higher BHE efficiency to match the requirements of large capacity GSHP installations. As a consequence, the inherent advantages of the co-axial designs are getting increased attention. This is in part also driven by a considerable body of research into large scale geothermal thermal storage applications where the co-axial design is favoured for the same reasons. To date, the application of vertical BHEs, in general, to large scale installations has been in the form of large arrays comprising tens or hundreds of boreholes typically drilled to depths of 50-200 m using conventional water well drilling equipment and completed with U-tubes.

Because of the need to maintain a minimum separation between the boreholes to avoid thermal interaction, the surface area required can be considerable. The overall efficiency of the drilling and operation of this design approach is low for reasons discussed above.

There have been a number of designs of BHEs over the last 25 years. The majority of close circuit GSHP installations utilise the two main practical designs for a vertical BHE, the first being the so-called U-tube (typically a loop of flexible plastic pipe) and the second being the coaxial (tube in tube) design. The coaxial design is known to have a more thermally efficient geometry, but is less practical for the majority of installers due to requirement for heavy equipment during installation. However, industrial scale projects can support the coaxial design. Both types of these BHE are filled with a working fluid, typically water containing an antifreeze solution.

The current standard practice comprises either drilling tens or hundreds of shallow (e.g. 100 m) boreholes ("U-tubes") or installing kilometers of plastic piping in shallow (1-2 m) trenches ("Slinkies") over hundreds of square meters. The cost, inconvenience and reduction of useable land area caused by the current practice, has acted as a barrier to the growth of geothermal energy applications in the UK in particular.

Recently, BHE installations have been constructed that have large heating/cooling requirements demanding multiple U-tube installations, for example up to 6000 BHEs. Each BHE column of the U-tube type needs to be separated from neighbouring BHEs by a distance of at least 4 meters in order to limit thermal interference therebetween. The increased thermal efficiency of coaxial geometry BHEs requires even greater mutual separation between the BHEs. Accordingly, any type of BHE installation for an industrial scale or commercial building might require acres or even hectares of adjacent land available to install all of the required BHEs and the necessary mutual separation.

It is known that all types of multiple vertical BHEs are installed in parallel to each other to a predetermined depth within the ground. The proximity of the vertical lengths of the BHEs introduces a so-called "interference penalty" which reduces the effective thermal energy transfer of each BHE, and so reduces the thermal efficiency of the entire installation.

A surface collector system is provided for the BHE installation to gather or distribute thermal energy to or from substantial buildings. Such a surface collector system may consist of up to 100% extra length of pipe in addition to the total vertical pipe length provided for the in-ground heat transfer process. This additional surface piping causes constant operating losses, such as thermal energy and pressure losses. This in turn requires additional electrical energy for compensation of the operating losses, as well as an increased cost for construction and maintenance of the extensive surface collector systems. This has, for a long time, been a limiting factor for large GSHP installations.

The present invention provides a geothermal energy system comprising a plurality of borehole heat exchangers, each borehole heat exchanger containing a working fluid and comprising an elongate tube having a closed bottom end and first and second adjacent elongate conduits interconnected at the bottom end, a manifold for the working fluid to which the plurality of borehole heat exchangers is connected, and a plurality of valves connected between the plurality of borehole heat exchangers and the manifold, whereby the first and second conduits of the plurality of borehole heat exchangers are selectively connectable to the manifold by operation of the valves.

Preferably, the first conduit is tubular and surrounded by the second conduit which is annular.

Preferably, each of the first and second conduits is connected to valves within the manifold whereby each of the plurality of borehole heat exchangers is selectively connectable to any other of the plurality of borehole heat exchangers.

Preferably, the valves are arranged to permit selective passing of the working fluid through a selected one or more of the borehole heat exchangers in a respective selected direction with respect to the respective first and second conduits of the respective borehole heat exchanger.

Preferably, the plurality of borehole heat exchangers extends downwardly and laterally into the ground from a central surface assembly of the elongate tubes to define a ground volume of the geothermal energy system which encloses the plurality of borehole heat exchangers, and wherein a footprint area of the central surface assembly is less that 10% of a footprint area of the ground volume of the geothermal energy system.

Preferably, the footprint area of the central surface assembly is less that 5% of a footprint area of the ground volume of the geothermal energy system.

Preferably, the geothermal energy system further comprises a control module connected to the plurality of borehole heat exchangers for controlling the valves for selectively distributing the working fluid within the plurality of borehole heat exchangers to achieve a particular thermal energy output profile.

When the geothermal energy system is connected to a building, the control module may be adapted to control the thermal energy supply to or from the building in response to a thermal energy demand profile from a building management system of the building.

Preferably, at least one first borehole heat exchanger has a major portion thereof extending in a substantially vertical orientation, at least one second borehole heat exchanger has a major portion thereof extending in a substantially horizontal orientation and at least one third borehole heat exchanger has a major portion thereof extending in a substantially inclined orientation.

Preferably, at least one of the borehole heat exchangers has an average inclination with respect to the vertical of from 3 to 95 degrees.

Preferably, at least one of the borehole heat exchangers has a major portion thereof with an average inclination with respect to the vertical of from 10 to 90 degrees.

Preferably, at least one of the borehole heat exchangers has a major portion thereof with an average inclination with respect to the vertical of from 30 to 60 degrees.

Preferably, the at least one borehole heat exchanger has a major portion thereof with an average inclination with respect to the vertical of about 45 degrees.

Optionally, at least some of the borehole heat exchangers each have at least a slanted uppermost portion which has an inclination with respect to the vertical of from 3 to 45 degrees, more typically from 5 to 20 degrees, and wherein such slanted uppermost portions diverge from adjacent slanted uppermost portions in a subsurface zone of the array.

Optionally, at least some of the borehole heat exchangers each have varying inclination with respect to the vertical, the varying inclination borehole heat exchangers having, beneath a linear uppermost portion, at least one portion of progressively varying inclination or at least two portions that are mutually inclined. This provides varying the borehole inclination along a major length of the borehole heat exchanger beneath an initial subsurface zone.

The present invention also provides a geothermal energy system comprising a plurality of borehole heat exchangers, each borehole heat exchanger containing a working fluid and comprising an elongate tube having a closed bottom end and first and second adjacent elongate coaxial conduits interconnected at the bottom end, the first conduit being tubular and surrounded by the second conduit which is annular, a plurality of valves connected to the plurality of borehole heat exchangers and a pump for pumping the working fluid through the borehole heat exchangers, wherein the valves and pump are arranged for selectively pumping the working fluid through a selected one or more of the borehole heat exchangers in a respective selected direction with respect to the respective first and second conduits of the respective borehole heat exchanger.

The present invention provides a geothermal energy system comprising a plurality of borehole heat exchangers, each borehole heat exchanger containing a working fluid, each borehole heat exchanger comprising an elongate tube having a closed bottom end, wherein the plurality of borehole heat exchangers extends downwardly and laterally into the ground from a central surface assembly of the elongate tubes to define a ground volume of the geothermal energy system which encloses the plurality of borehole heat exchangers, wherein a footprint area of the central surface assembly is less that 10% of a footprint area of the ground volume of the geothermal energy system.

Preferably, the central surface assembly comprises a rigid structure to which upper ends of the borehole heat exchangers are affixed.

Preferably, the majority of the length of each of the borehole heat exchangers is mutually separated from other borehole heat exchangers so as to be thermally independent therefrom.

Preferably, the majority of the length of each of the borehole heat exchangers is mutually separated from other borehole heat exchangers by a distance of at least 4 meters.

Preferably, the vertical depth of at least one of the plurality of borehole heat exchangers is at least 5 meters, more preferably at least 10 meters.

Preferably, the vertical depth of at least one of the plurality of borehole heat exchangers is at least 100 meters.

The present invention provides a geothermal energy system connected to a heating and cooling system of a building, the geothermal energy system comprising a plurality of borehole heat exchangers, each borehole heat exchanger containing a working fluid and comprising an elongate tube having a closed bottom end, a control module connected to the plurality of borehole heat exchangers for selectively distributing the working fluid within the plurality of borehole heat exchangers according to a thermal profile of the building.

Preferably, at least one first borehole heat exchanger has a major portion thereof extending in a substantially vertical orientation, at least one second borehole heat exchanger has a major portion thereof extending in a substantially horizontal orientation and at least one third borehole heat exchanger has a major portion thereof extending in a substantially inclined orientation.

The present invention further provides a method of operating a geothermal energy system connected to a heating and cooling system of a building, the geothermal energy system comprising a plurality of borehole heat exchangers, each borehole heat exchanger containing a working fluid and comprising an elongate tube having a closed bottom end, the method including the step of;

selectively distributing the working fluid within the plurality of borehole heat exchangers according to a thermal profile of the building.

The present invention further provides a method of operating a geothermal energy system comprising a plurality of borehole heat exchangers, each borehole heat exchanger containing a working fluid and comprising an elongate tube having a closed bottom end and first and second adjacent elongate conduits interconnected at the bottom end, a manifold for the working fluid to which the plurality of borehole heat exchangers is connected, and a plurality of valves connected between the plurality of borehole heat exchangers and the manifold, the method including the step of;

selectively connecting the first and second conduits of the plurality of borehole heat exchangers to the manifold by operation of the valves.

The present invention further provides a method of operating a geothermal energy system comprising a plurality of borehole heat exchangers, each borehole heat exchanger containing a working fluid and comprising an elongate tube having a closed bottom end, at least one first borehole heat exchanger having a major portion thereof extending in a substantially vertical orientation, at least one second borehole heat exchanger having a major portion thereof extending in a substantially horizontal orientation and at least one third borehole heat exchanger having a major portion thereof extending in a substantially inclined orientation, and a manifold for the working fluid to which the plurality of borehole heat exchangers is connected; the method including the step of:

selectively connecting the at least one first, second and third borehole heat exchangers to the manifold by operation of the valves according to a positive or negative heat demand.

The present invention further provides a method of operating a geothermal energy system comprising a plurality of borehole heat exchangers, each borehole heat exchanger containing a working fluid and comprising an elongate tube having a closed bottom end and first and second adjacent elongate coaxial conduits interconnected at the bottom end, the first conduit being tubular and surrounded by the second conduit which is annular, a plurality of valves connected to the plurality of borehole heat exchangers and a pump for pumping the working fluid through the borehole heat exchangers; the method including the step of:

selectively pumping the working fluid through a selected one or more of the borehole heat exchangers in a respective selected direction with respect to the respective first and second conduits of the respective borehole heat exchanger.

In particular, the preferred embodiments of the present invention relate to a method of and apparatus for expansion into the ground strata of one or more borehole heat exchangers from a limited surface space yet which is capable of large scale harvesting of low enthalpy geothermal energy, and is also, selectively, capable of injecting of industrial volumes of excess energy with use of the ground strata as the thermal energy store.

The preferred embodiments of the present invention can provide a low enthalpy, geothermal energy storage and retrieval installation that can be precisely matched to existing and newly constructed building services systems that delivers space heating, cooling, ventilation and hot water services to a wide range of buildings on an industrial or community-based scale with very high efficiency, low carbon emissions and with a compact surface footprint. In addition, the installation may be operated principally, and selectively, as a thermal energy source, sink or store depending upon the relevant building(s) requirement for heating and cooling over time.

By providing a plurality of closed loop borehole heat exchangers within a system that can selectively (a) cause fluid flow in a selected direction in any borehole heat exchanger(s); and/or (b) select which of the plurality of borehole heat exchanger(s) is to be operable at all or in a selected fluid flow direction and/or (c) provide, within the plurality of closed loop borehole heat exchangers, different inclinations within a given borehole heat exchanger and/or within the plurality of borehole heat exchangers, a very versatile and energy efficient system is provided that can selectively constitute a thermal energy source, sink or store having controllable thermal properties.

The installation can also provide for the efficient exchange of thermal energy between adjacent buildings and faculties so as to conserve available energy. Furthermore, the installation may also include additional thermal energy sources or sinks such as subsurface aquifers, adjacent water reservoirs or water pumping systems and is readily combined with other renewable energy sources and other heating or cooling loads to further reduce overall carbon emissions.

A number of prior art documents have disclosed various aspects of geothermal energy systems, but the disclosed systems, and methods of operating them, have a number of technical limitations.

For example, GB 1496075 (Erda Energy) includes FIGS. 1 to 4 which disclose open geothermal wells that bring hot fluid up to a reservoir. The wells can be individually opened by valves. However, there are no heat exchangers. This is not a closed loop system incorporating borehole heat exchangers. FIGS. 5 and 6 do disclose borehole heat exchangers. However, the system is very limited in application because the fluid can only be driven in one direction. Also, the heat exchangers have the same inclination, and the surface assembly has a relatively large footprint. There is no disclosure of selecting the heat exchangers according to a positive or negative heat demand. The disclosed device is a heat source, and there is no disclosure of selectively using at least one first borehole heat exchanger as a heat source and at least one second borehole heat exchanger as a heat sink. This document does not disclose the redistribution of thermal energy within a plurality of borehole heat exchangers.

JP 9-60985 (Susawa) discloses a system for giving up heat, e.g. for snow melting, rather than recovering geothermal heat, for heating buildings or for removing heat from buildings, using heat exchangers. The ground installed heat exchangers for recovering geothermal energy are vertical. They give up energy to radiating tubes which are horizontal. Although the heat exchangers are connected by valves, there is no disclosure that the conduits are selectively connectable by the valves to the manifold so that each borehole heat exchanger can individually be driven selectively in a heating or cooling mode, to a desired extent, by switching the flow direction of the fluid through the respective heat exchanger. Also, the heat exchangers have the same inclination, and the surface assembly has a relatively large footprint.

GB 2045909 (Schmidt) discloses a heat pump installation in which coaxial borehole heat exchangers are driven in a single flow direction. The plural coaxial heat exchangers are at different constant inclinations, in a hemispherical star-like array. The pipes are uniformly straight and short. There is no disclosure of selective pumping in different directions for selectively connecting the exchangers oriented in different directions according to positive or negative heat demand. The disclosed device is a heat source, and there is no disclosure of selectively using at least one first borehole heat exchanger as a heat source and at least one second borehole heat exchanger as a heat sink.

WO 82/02935 (Jovy), DE 3048870 (Neumann), DE 3114262 (Welte) and JP 57-58024 (Misawa) similarly disclose geothermal heat pump installations, as a heat source, in which uniformly straight and short borehole heat exchangers in a radiating or star-like array are driven in a single flow direction.

FR 2456919 (Svenska Flaktfabriken) discloses a geothermal system with an array of radiating inclined tubes. Also, the heat exchangers have the same inclination, and the surface assembly has a relatively large footprint. Although the absorber device may be operable for recovering heat from the ground or transmitting heat to the ground, since there is a single circuit for the working fluid there is no disclosure that one heat exchanger can act as a heat source while simultaneously another can act as a heat sink (thereby transmitting heat from one to the other). There therefore is no disclosure of selectively using at least one first borehole heat exchanger as a heat source and at least one second borehole heat exchanger as a heat sink.

EP 1048820 (Flowtex) discloses a geothermal system with either a random interconnected tube system connected to a single vertical tube associated with a single ground station or a single tube extending between two ground stations. The surface assembly has a relatively large footprint. There is no disclosure of a plurality of orientations for plural heat exchangers.

WO2007/097701 (SEEC) discloses a heating/cooling apparatus having a control gear which controls valves to direct working fluid within the plurality of borehole heat exchangers which are in inner and outer circles but not according to a thermal profile of a building. The control gear distributes the working fluid within the plurality of borehole heat exchangers either in a replenish mode (heat sink) or a harvest mode (heat source) but there is no disclosure that one heat exchanger can act as a heat source while simultaneously another can act as a heat sink (thereby transmitting heat from one to the other). Accordingly, there is no disclosure of selectively using at least one first borehole heat exchanger as a heat source and at least one second borehole heat exchanger as a heat sink.

GB 2434200 (Roxbury) discloses a heat exchanger for a geothermal energy system but the heat exchanger does not have a control module for distributing the working fluid within the plurality of borehole heat exchangers according to a thermal profile of the building. The heat exchanger does not have a control module for distributing the working fluid within the plurality of borehole heat exchangers thereby selectively using at least one first borehole heat exchanger as a heat source and at least one second borehole heat exchanger as a heat sink.

FR 2817024 (Solterm) discloses a geothermal system having plural coaxial heat exchangers at constant inclinations in an array forming an angular segment. Neighbouring heat exchangers may have different inclinations. The pipes are uniformly straight and short. There is no disclosure of the borehole depth, varying the inclination in one borehole, or varying inclinations of different boreholes that are individually controllable to control heat recovery. Also, there is no disclosure of selective pumping in different directions according to positive or negative heat demand. One flow direction only is shown. Although it is stated that the heat pump can be operated selectively in heating mode or, inversely, in air conditioning mode, there is no disclosure of forward and reverse pumping through the heat exchangers.

EP 1808570 (Soilmec) discloses a geothermal system having a coaxial borehole heat exchangers at constant inclination, just above horizontal, apart from an initial radiused part from the initial vertical. There is no disclosure of the borehole depth, varying the inclination in one borehole, or varying inclinations of different boreholes that are individually controllable to control heat recovery. Also, there is no disclosure of the method of selective pumping in different directions according to positive or negative heat demand. One flow direction only is shown for the closed system of FIGS. 1 to 2. However, for FIGS. 3 and 4 it is stated that the flow direction can be reversed but this is only in an open system to release fluid into the rocks from the outer annular conduit.

WO 03/069240 (Bobbasmill) discloses a combined heating and cooling unit which includes a single geothermal source, which can act selectively as a heat sink or a heat source. However, there is no disclosure that plural borehole heat exchangers are provided and that one such borehole heat exchanger can act as a heat source while simultaneously another such borehole heat exchanger can act as a heat sink (thereby transmitting heat from the one to the other). Accordingly, there is no disclosure of selectively using at least one first borehole heat exchanger as a heat source and at least one second borehole heat exchanger as a heat sink.

U.S. Pat. No. 4,134,462 (Clay) discloses a geothermal energy recovery system acting as a heat source. This document does not disclose the redistribution of thermal energy within a plurality of borehole heat exchangers.

Embodiments of the present invention will now be described by way of example only, with reference to the accompanying drawings, in which:

FIG. 10 is a schematic elevational view showing various well profiles for borehole heat exchangers of the geothermal energy system in accordance with a tenth embodiment of the present invention;

FIG. 11 is a schematic elevational view showing further various well profiles for borehole heat exchangers of the geothermal energy system in accordance with an eleventh embodiment of the present invention;

Figure 12:
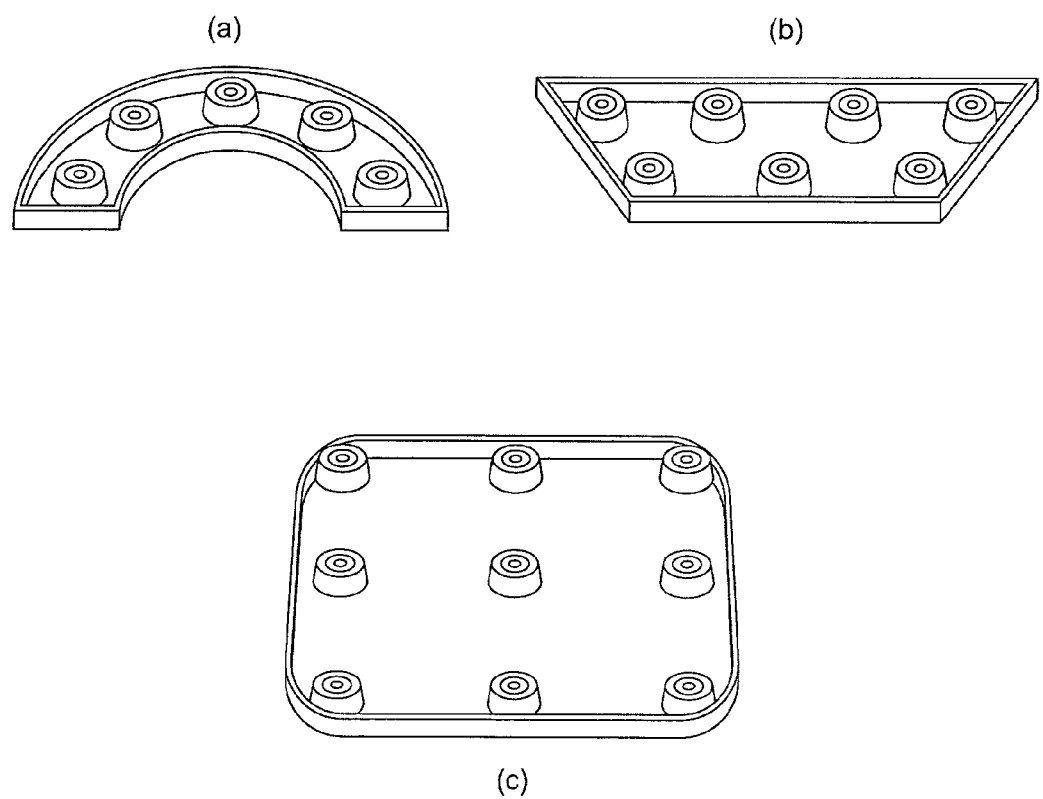
Figure 14:
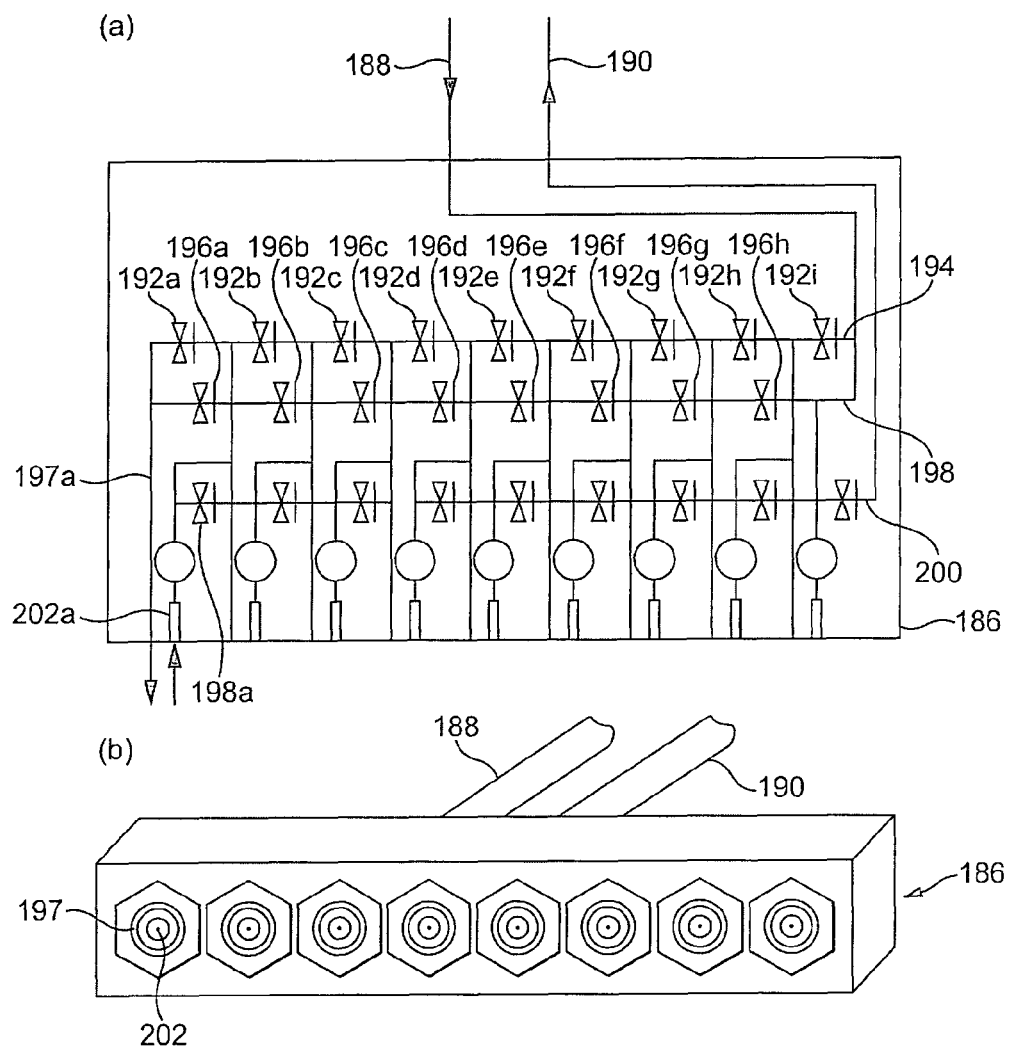
Figure 15:
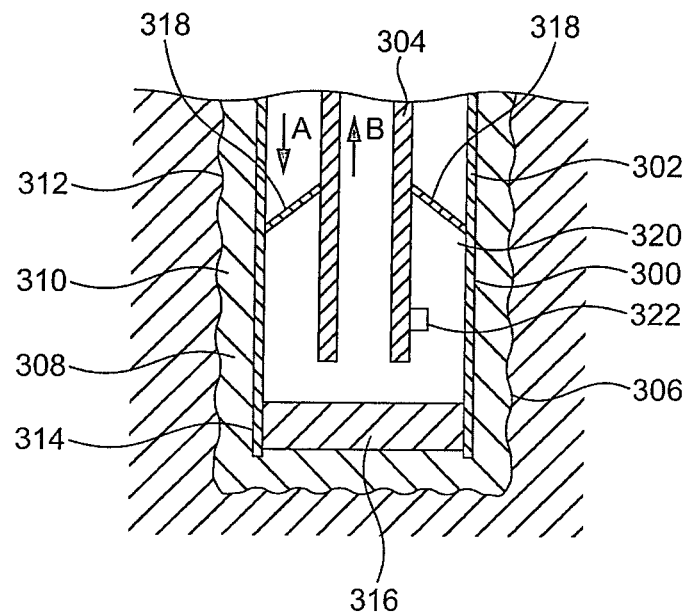
Figure 16:
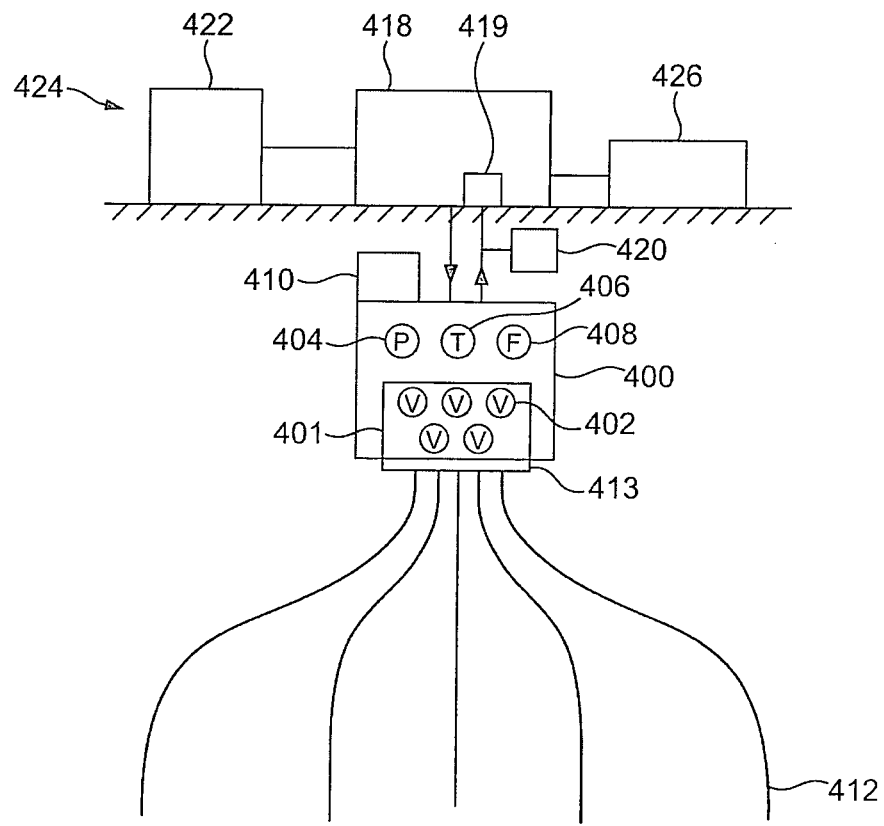

FIGS. 12 (*a*), (*b*) and (*c*) are schematic plan views showing respective cluster pads for plural borehole heat exchangers of the geothermal energy system in accordance with further embodiments of the present invention;

FIGS. 13 (*a*), (*b*), (*c*), (*d*), (*e*) and (*f*) are schematic plan views showing respective array configurations for plural borehole heat exchangers of the geothermal energy system in accordance with further embodiments of the present invention;

FIGS. 14 (*a*) and (*b*) are schematic drawings showing a central manifold unit of the geothermal energy system in accordance with further embodiments of the present invention;

FIG. 15 shows schematically in detail the structure of an embodiment of a borehole heat exchanger for use in the various embodiments of the present invention; and FIG. 16 shows schematically a geothermal energy system according to another embodiment of the present invention.

The core of the system of the preferred embodiments of the present invention is a compact array or multiple arrays of borehole heat exchangers (BHE), most preferably coaxial, that are installed in boreholes that are directionally drilled from a rigid structure comprising a small pad or pads, preferably of concrete in the near vicinity of the building being served. The borehole heat exchangers may be installed vertically, inclined or horizontally in the subsurface formations according to whether the primary objective is to provide space cooling, heating or both.

Optimum cooling is provided by shallow, horizontal borehole heat exchangers, optimum heating is delivered by deep, vertical borehole heat exchangers and optimum combined heating and cooling is served by borehole heat exchangers inclined at some angle (most typically 45 degrees) from vertical. In addition, an individual borehole heat exchanger may be split into two or more branches (multi-leg completion) from some point below the surface, according to design requirements.

Also taken into consideration in the design of the borehole heat exchanger array(s) of the preferred embodiments is the spatial orientation of the bedding planes, porosity and permeability, especially large fractures, that are a feature of the ground formations in that area. This approach provides the opportunity to enhance the thermal efficiency of the borehole heat exchanger by drilling the containing boreholes in a manner so as to physically intercept the ground formations in the most favourable orientation that will take advantage of groundwater accumulations and subsurface flows.

The typical vertical depth range of the borehole heat exchangers is from 10 to 750 meters below ground level although greater depths are possible. In an array of borehole heat exchangers, typically at least one of the borehole heat exchangers extends to a vertical depth of at least 100 meters, and up to 750 meters.

Figure 1:
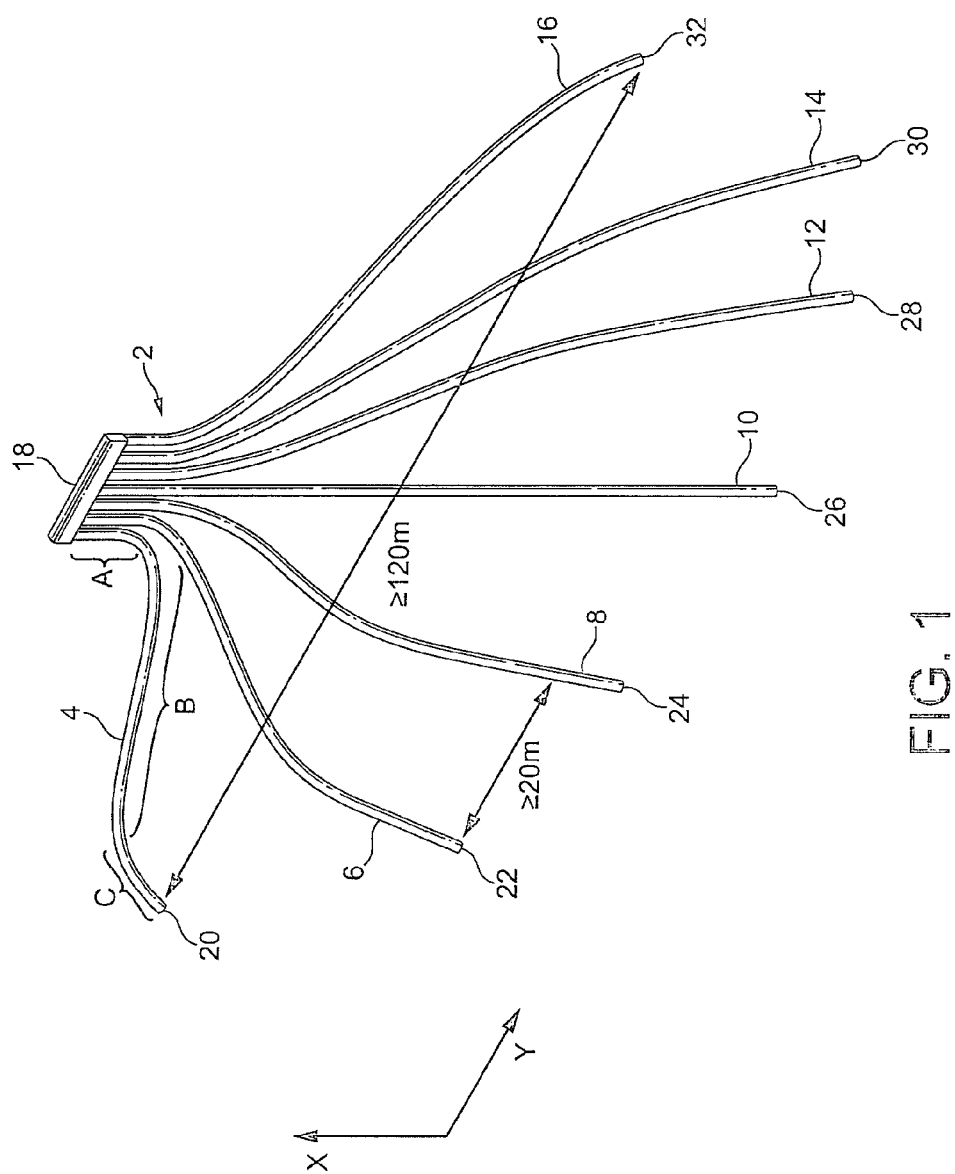
FIG. 1 is a schematic perspective view of an array of borehole heat exchangers of a geothermal energy system in accordance with a first embodiment of the present invention.

Referring to FIG. 1, there is shown schematically an array of borehole heat exchangers of a geothermal energy system in accordance with a first embodiment of the present invention. The array 2 is two-dimensional and comprises seven borehole heat exchangers 4, 6,8,10,12,14,16, each affixed at its respective upper end to a central common manifold unit 18. Preferably, each borehole heat exchanger 4, 6,8,10,12, 14,16 has a coaxial construction, as is known in the art and discussed herein. Each borehole heat exchanger 4,6,8,10,12, 14,16 has a first substantially vertical top portion A extending downwardly from the manifold unit 18; a second substantially shallowly inclined, typically at an angle to the vertical of from 30 to 60 degrees, more preferably 45 degrees, middle portion B extending downwardly and laterally away from the manifold unit 18; and a third substantially steeply inclined typically at an angle to the vertical of greater than 60 degrees, lower portion C extending yet further downwardly and laterally away from the manifold unit 18. The lengths and inclinations of the various portions can vary, for any given borehole heat exchanger, and between borehole heat exchangers. The array 2 is structured and dimensioned to achieve mutual spacing between the borehole heat exchangers, so that each of them is substantially thermally independent. Typically, the bottom ends 20, 22, 24, 26, 28, 30, 32 of the lower portions C are mutually spaced by least 20 meters, and the lateral width of the entire array 2 is at least 120 meters. Using terms known in the oil- and gas-drilling art for directional drilling with respect to borehole orientations, the top portion A would be referred to as an angle build section, the middle portion B would be referred to as an angle hold section, and the bottom portion C would be referred to as an angle drop off section.

Figure 2:
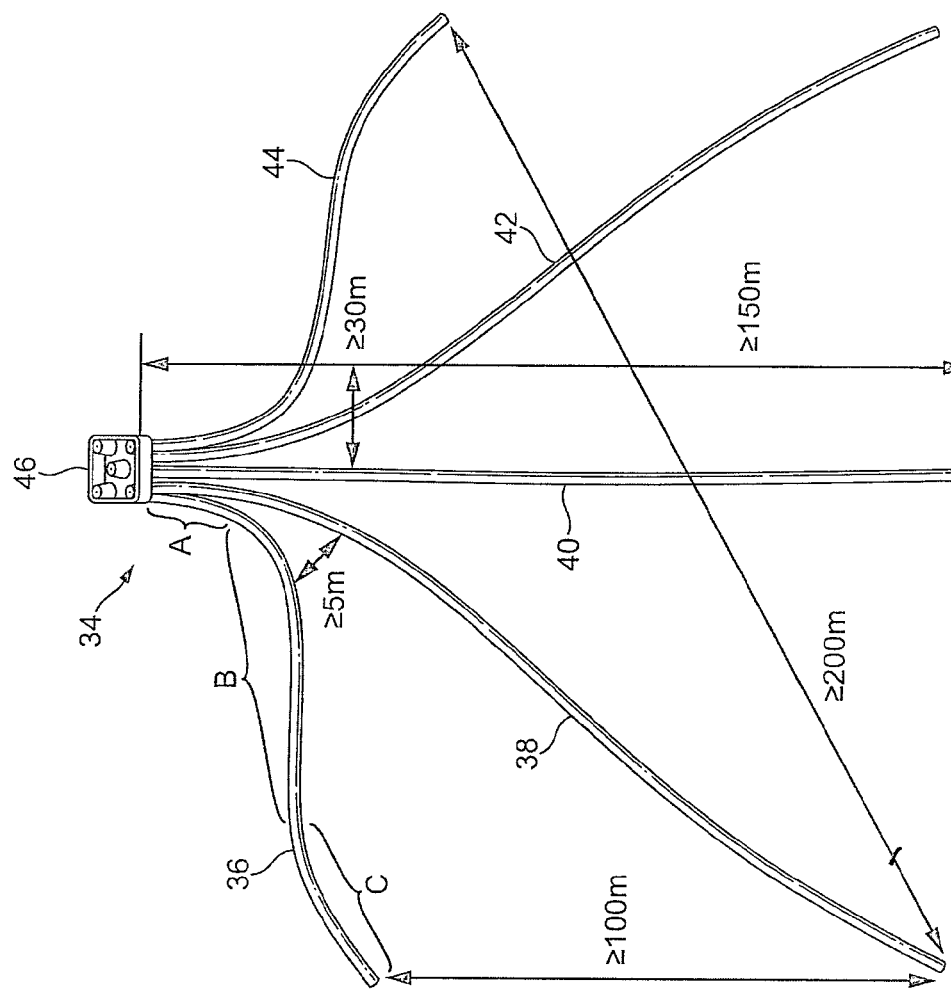
FIG. 2 is a schematic perspective view of an array of borehole heat exchangers of a geothermal energy system in accordance with a second embodiment of the present invention.

Referring to FIG. 2, there is shown schematically an array of borehole heat exchangers of a geothermal energy system in accordance with a second embodiment of the present invention. The array 34 is three-dimensional and comprises five coaxial borehole heat exchangers 36, 38,40,42,44, each affixed at its respective upper end to a rigid structure in the form of a pad 46, preferably of concrete, and to which a central common manifold unit (not shown) is to be attached. A central borehole heat exchanger 40 extends substantially vertically downwardly from the pad 46 along its entire length, which is typically at least 150 meters. The remaining four borehole heat exchangers 36,38,42,44 are substantially symmetrically arranged in a square configuration, and each has a first substantially vertical top portion A extending downwardly from the pad 46; a second substantially shallowly inclined middle portion B extending downwardly and laterally away from the pad 46; and a third substantially steeply inclined lower portion C extending yet further downwardly and laterally away from the pad 46. The lengths and inclinations of the various portions can vary for the borehole heat exchangers. The array 34 is structured and dimensioned to achieve mutual spacing between the borehole heat exchangers, so that each of them is substantially thermally independent. Typically, the bottom ends 46, 48, 50, 52 of the lower portions C of the borehole heat exchangers 36,38,42, 44 are mutually spaced by least 100 meters along the side of the square configuration, and by least 200 meters along the diagonal of the square configuration.

Figure 3:
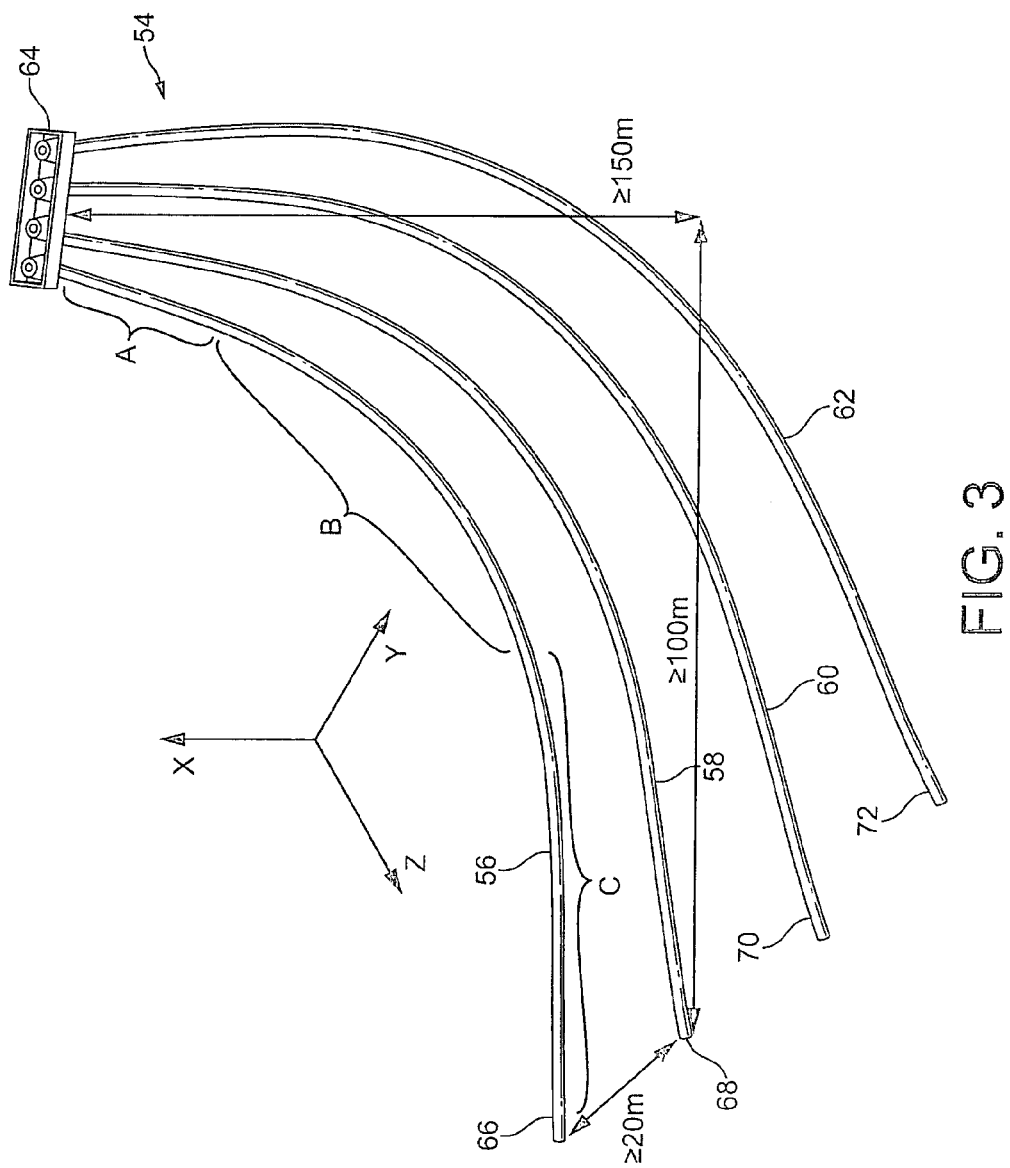
FIG. 3 is a schematic perspective view of an array of borehole heat exchangers of a geothermal energy system in accordance with a third embodiment of the present invention.

Referring to FIG. 3, there is shown schematically an array of borehole heat exchangers of a geothermal energy system in accordance with a third embodiment of the present invention. The array 54 is three-dimensional and comprises four coaxial borehole heat exchangers 56,58,60,62, each affixed at its respective upper end to a rigid structure in the form of a pad 64, preferably of concrete, and to which a central common manifold unit (not shown) is to be attached. The four borehole heat exchangers 56,58,60,62 are arranged in a fan-like configuration, oriented in a substantially common direction, and each has a first substantially vertical top portion A extending downwardly from the pad 64; a second substantially inclined middle portion B extending downwardly and laterally away from the pad 64; and a third substantially horizontal lower portion C extending yet further laterally away from the pad 64. The lengths and inclinations of the various portions can vary for the borehole heat exchangers. The array 54 is structured and dimensioned to achieve mutual spacing between the borehole heat exchangers, so that each of them is substantially thermally independent. Typically, the bottom ends 66, 68, 70, 72 of the lower portions C of the borehole heat exchangers 56,58,60, 62 are mutually spaced by least 20 meters, the depth of the borehole heat exchangers 56,58,60,62 is at least 150 meters, and the lateral extent away from the pad 64 of the borehole heat exchangers 56,58,60,62 is at least 100 meters.

Figure 4:
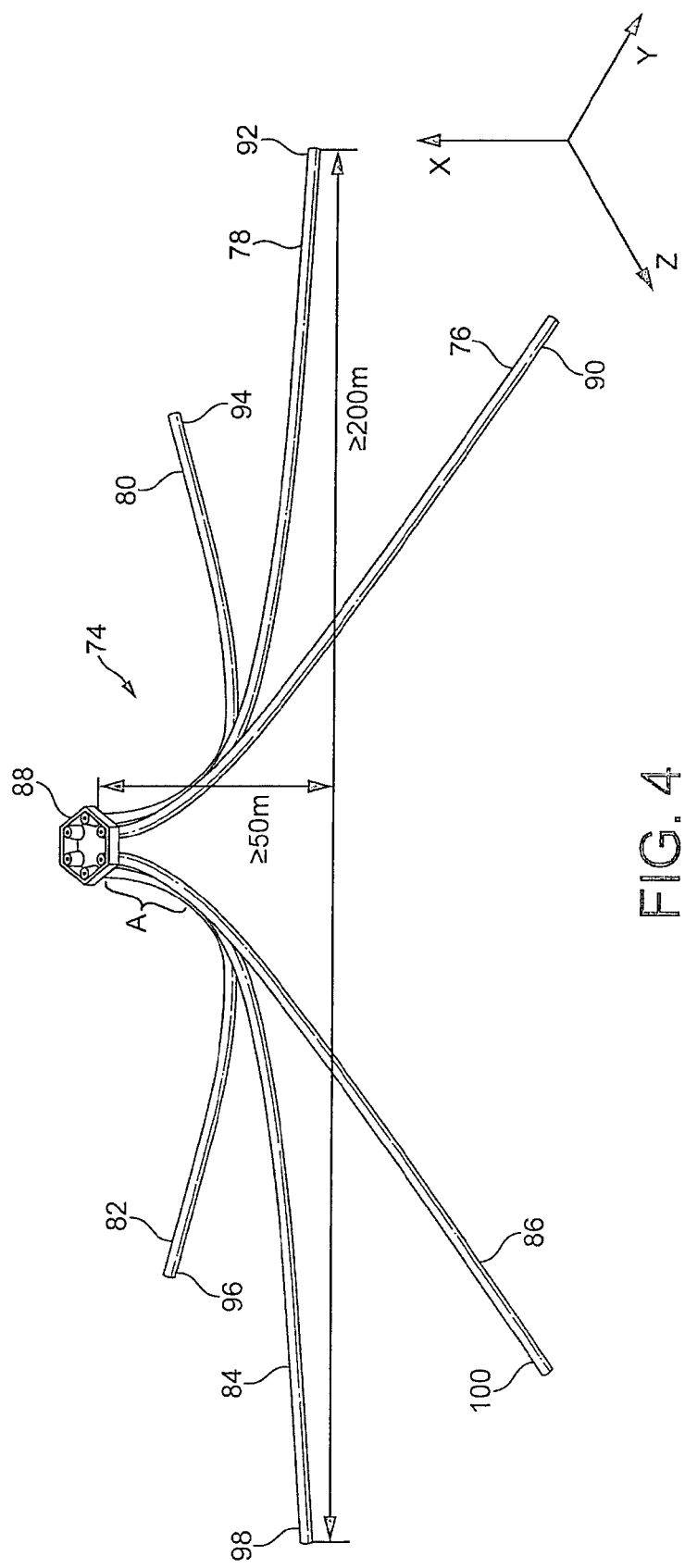
FIG. 4 is a schematic perspective view of an array of borehole heat exchangers of a geothermal energy system in accordance with a fourth embodiment of the present invention.

Referring to FIG. 4, there is shown schematically an array of borehole heat exchangers of a geothermal energy system in accordance with a fourth embodiment of the present invention. The array 74 is three-dimensional and comprises six coaxial borehole heat exchangers 76,78,80,82,84,86 each affixed at its respective upper end to a rigid structure in the form of a pad 88, preferably of concrete, and to which a central common manifold unit (not shown) is to be attached. The six borehole heat exchangers 76, 78, 80,82,84,86 are arranged in a star-like configuration, extending substantially radially away from pad 88 and equally mutually spaced. Each borehole heat exchanger 76,78,80,82,84,86 has a first substantially vertical upper portion A extending downwardly from the pad 88, and a second substantially inclined lower portion B extending downwardly and laterally away from the pad 88. The borehole heat exchangers 76, 78, 80,82,84, 86 are substantially L-shaped and the portion B is substantially horizontal to meet a cooling demand. The lengths and inclinations of the various portions can vary for the borehole heat exchangers. The array 74 is structured and dimensioned to achieve mutual spacing between the borehole heat exchangers, so that each of them is substantially thermally independent. Typically, the bottom ends 90, 92, 94, 96, 98, 100 of the lower portions B of the borehole heat exchangers 76,78,80,82,84,86 are mutually spaced so that the depth of the borehole heat exchangers 76,78,80,82,84,86 is at least 50 meters, and the total lateral extent of the array 74 is at least 200 meters.

Figure 5:
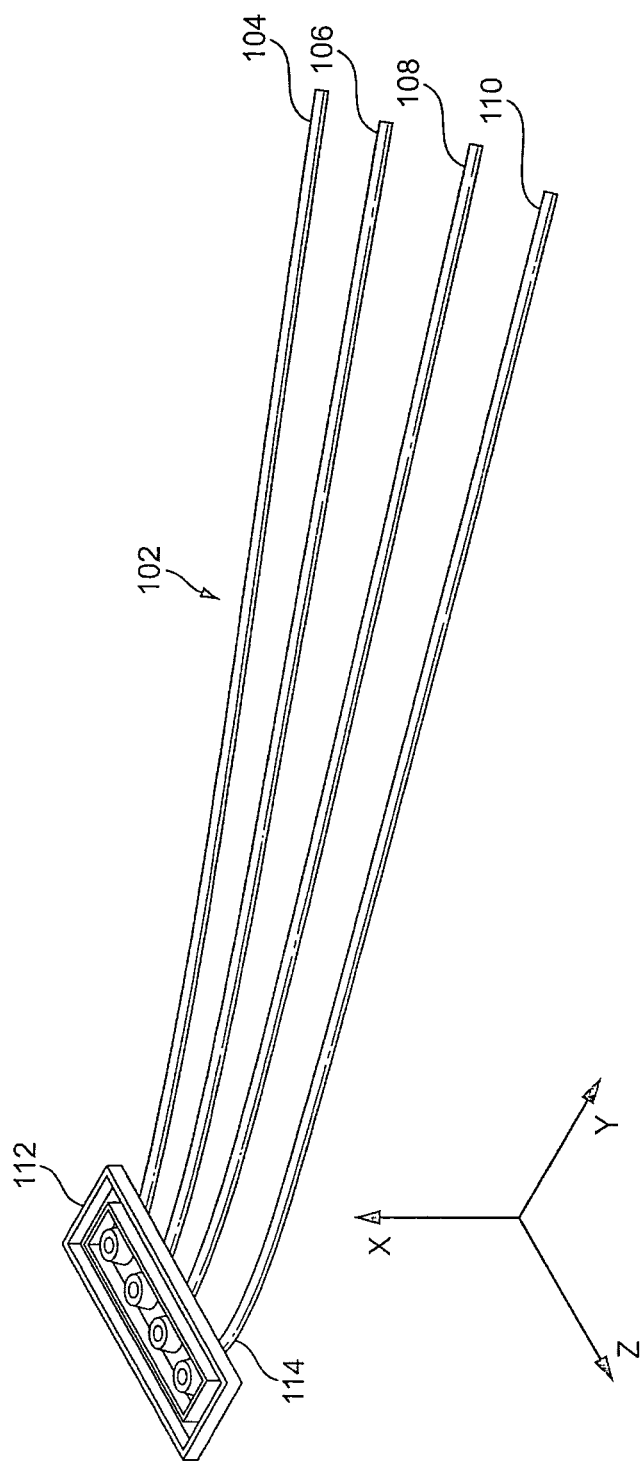
FIG. 5 is a schematic perspective view of an array of borehole heat exchangers of a geothermal energy system in accordance with a fifth embodiment of the present invention.

Referring to FIG. 5, there is shown schematically an array of borehole heat exchangers of a geothermal energy system in accordance with a fifth embodiment of the present invention. The array 102 is three-dimensional and comprises four coaxial borehole heat exchangers 104, 106, 108, 110, each affixed at its respective upper end to a rigid structure in the form of a pad 112, preferably of concrete, and to which a central common manifold unit (not shown) is to be attached. The four borehole heat exchangers 104, 106, 108, 110 are arranged in a substantially linear configuration, substantially aligned along the length thereof, and each has, apart from an initial sharply angled connection 114 to the pad 112, a single substantially inclined portion extending downwardly and laterally away from the pad 112. The lengths and inclinations of the borehole heat exchangers can vary. The array 112 is structured and dimensioned to achieve mutual spacing between the borehole heat exchangers, so that each of them is substantially thermally independent.

Figure 6:
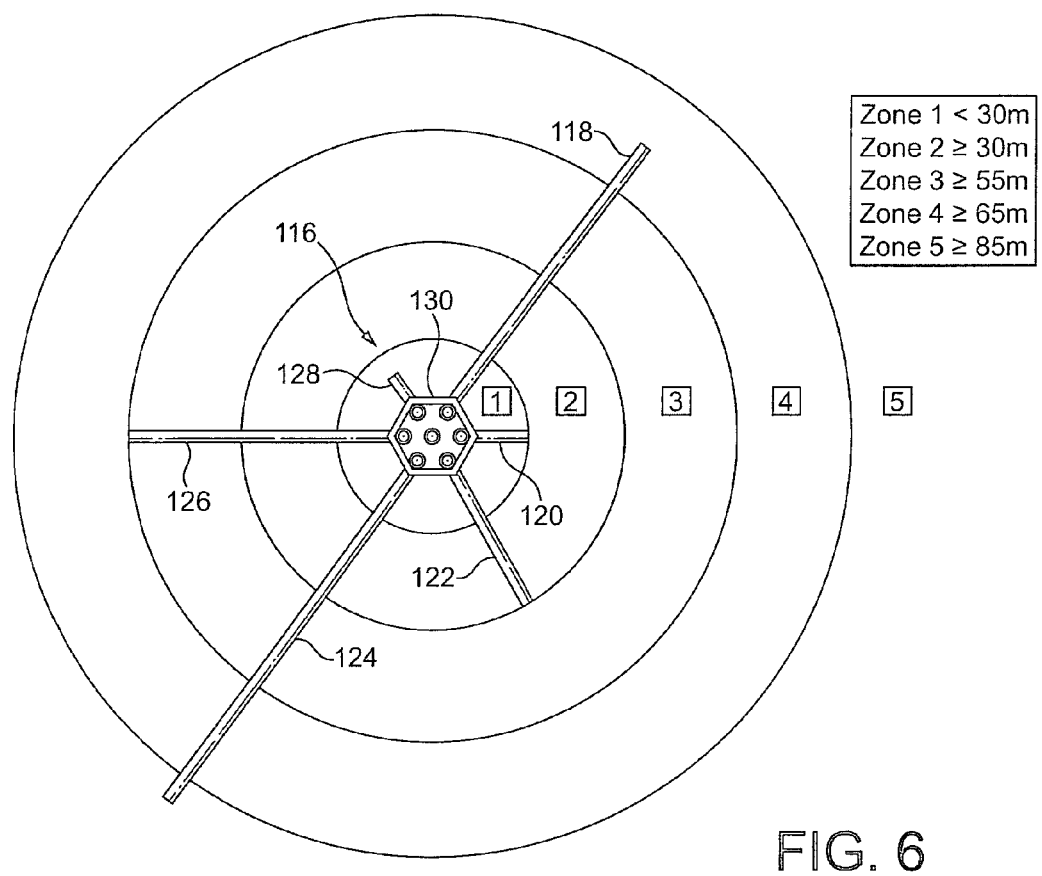
FIG. 6 is a schematic plan view of an array of borehole heat exchangers of a geothermal energy system in accordance with a sixth embodiment of the present invention.

Referring to FIG. 6, there is shown schematically an array of borehole heat exchangers of a geothermal energy system in accordance with a sixth embodiment of the present invention. The array 116 is three-dimensional and comprises six coaxial borehole heat exchangers 118,120,122,124,126, 128 (although another vertical borehole heat exchanger, not shown, may be provided), each affixed at its respective upper end to a pad 138, preferably of concrete, and to which a central common manifold unit (not shown) is to be attached. The six borehole heat exchangers 118,120,122,124,126,128 are arranged in a star-like configuration, extending substantially radially away from pad 138. Each borehole heat exchanger 118,120,122,124,126, 128 may have the vertical and inclined configuration of the previous embodiments of FIG. 4, for example. In this embodiment, the lateral, in particular radial, extent of the six borehole heat exchangers 118,120,122,124,126,128 varies. The radial extent is divided into a plurality of zones of progressively increasing radius. For example, zone 1 has a radius of less than 30 meters, zone 2 at least 30 meters, zone 3 at least 55 meters, zone 4 at least 65 meters and zone 5 at least 85 meters. The six borehole heat exchangers 118,120,122,124,126,128 extend into different zones, preferably with each borehole heat exchanger 118,120,122,124,126,128 extending into a respective different zone. In this way, the array 116 is structured and dimensioned to achieve mutual spacing between the borehole heat exchangers, so that each of them is substantially thermally independent.

Figure 7:
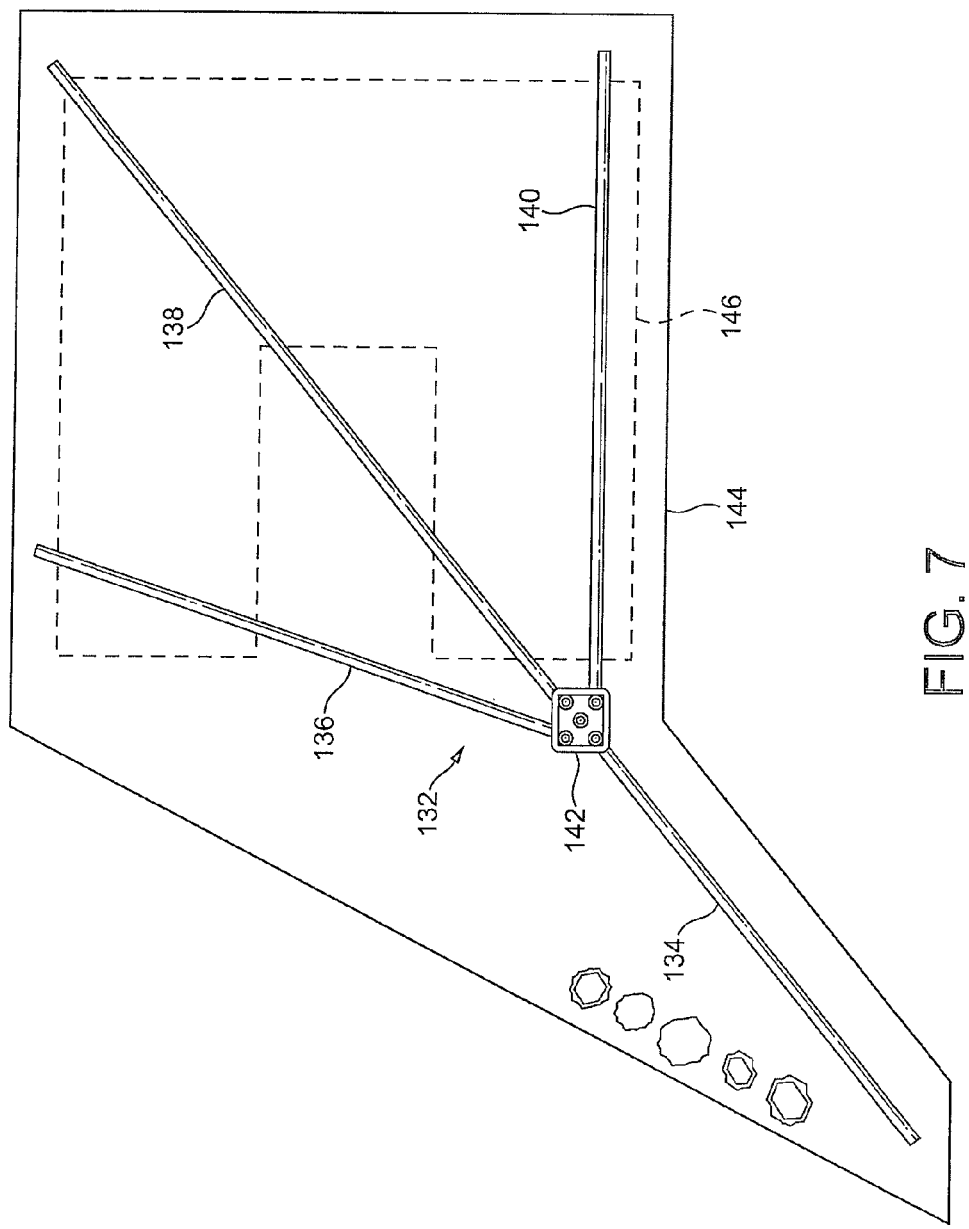
FIG. 7 is a schematic plan view of an array of borehole heat exchangers of a geothermal energy system in accordance with a seventh embodiment of the present invention.

Referring to FIG. 7, there is shown schematically an array of borehole heat exchangers of a geothermal energy system in accordance with a seventh embodiment of the present invention. The array 132 is three-dimensional and comprises four coaxial borehole heat exchangers 134, 136, 138, 140, each affixed at its respective upper end to a pad 142, preferably of concrete, and to which a central common manifold unit (not shown) is to be attached. The four borehole heat exchangers 134, 136, 138, 140, are arranged in a configuration so as laterally to be enclosed within the boundary 144 of a property containing a building 146 to be served by the geothermal energy system. Therefore the footprint of the ground volume of the geothermal energy system is accommodated within a property boundary. The pad 142 is located adjacent to the building 146, and so is readily accessible for maintenance purposes, etc. The footprint of the pad 142 is significantly less, typically less than 10%, more preferably less than 5%, yet more preferably less than 1%, than that of the ground volume of the geothermal energy system. Again, the array 132 is structured and dimensioned to achieve mutual spacing between the borehole heat exchangers, so that each of them is substantially thermally independent.

In any of the foregoing embodiments of an array of borehole heat exchangers, and in any other array employed in accordance with the present invention, it is possible to commence drilling using a "slant" drilling rig, whereby the initial drilling is at an inclination of from 5° to 20° to the vertical. After the start of drilling, that drilling angle may be maintained, may continue to increase, or may be decreased, the angle of the progressively deeper portion depending on building area size and the number of borehole heat exchangers. Using this technique provides the technical result that the subsurface separation between adjacent boreholes may be increased at shallower depth. This in turn provides the technical advantage of increasing the net useable hole for a predetermined length of borehole.

In these embodiments, at least some of the borehole heat exchangers each have at least a slanted uppermost portion which has an inclination with respect to the vertical of from 3 to 45 degrees, more typically from 5 to 20 degrees, and wherein such slanted uppermost portions diverge from adjacent slanted uppermost portions in a subsurface zone of the array.

In some embodiments, at least some of the borehole heat exchangers each have varying inclination with respect to the vertical, the varying inclination borehole heat exchangers having, beneath a linear uppermost portion, at least one portion of progressively varying inclination or at least two portions that are mutually inclined. This provides varying the borehole inclination along a major length of the borehole heat exchanger beneath an initial subsurface zone.

Figure 8:
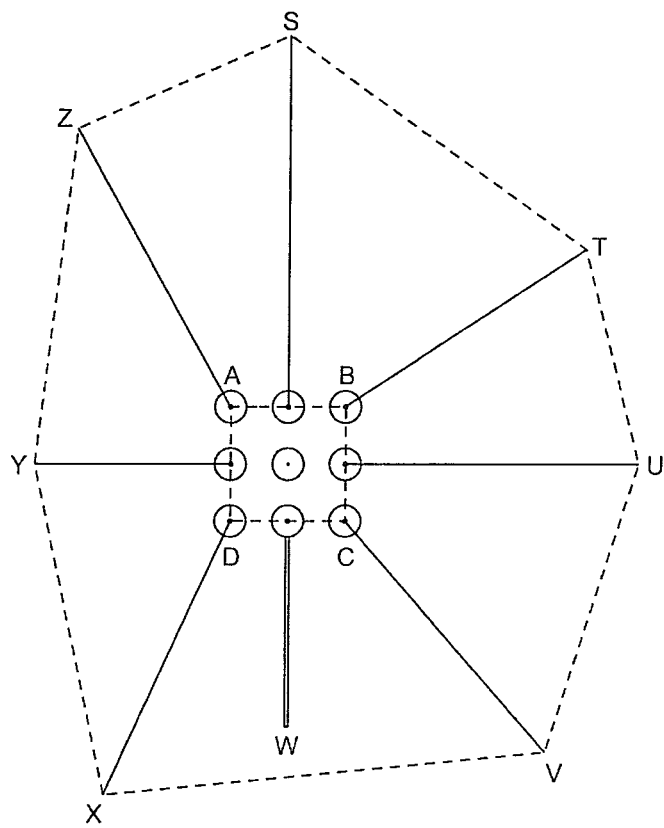
FIG. 8 is a schematic plan view showing the relationship between the area of the footprint of the surface assembly and the footprint area of the ground volume of the geothermal energy system in accordance with an eighth embodiment of the present invention.

Referring to FIG. 8, there is shown schematically a plan view of a geothermal energy system in accordance with an eighth embodiment of the present invention. The footprint of the pad, represented by the area A1 defined by points A, B, C and D, is less, and preferably significantly less, typically less than 10%, than the area of the footprint of the ground volume, more preferably less than 5%, most preferably less than 1%, represented by the area A2 defined by points S, T, U, V, W, X, Y and Z, of the geothermal energy system. In other words, the ratio A2/A1 is greater than 1. The points A-D represent the uppermost coordinates of the axis of the outer casing. The points S-Z represent the bottom hole coordinates of the axis of the outer casing.

Figure 9:
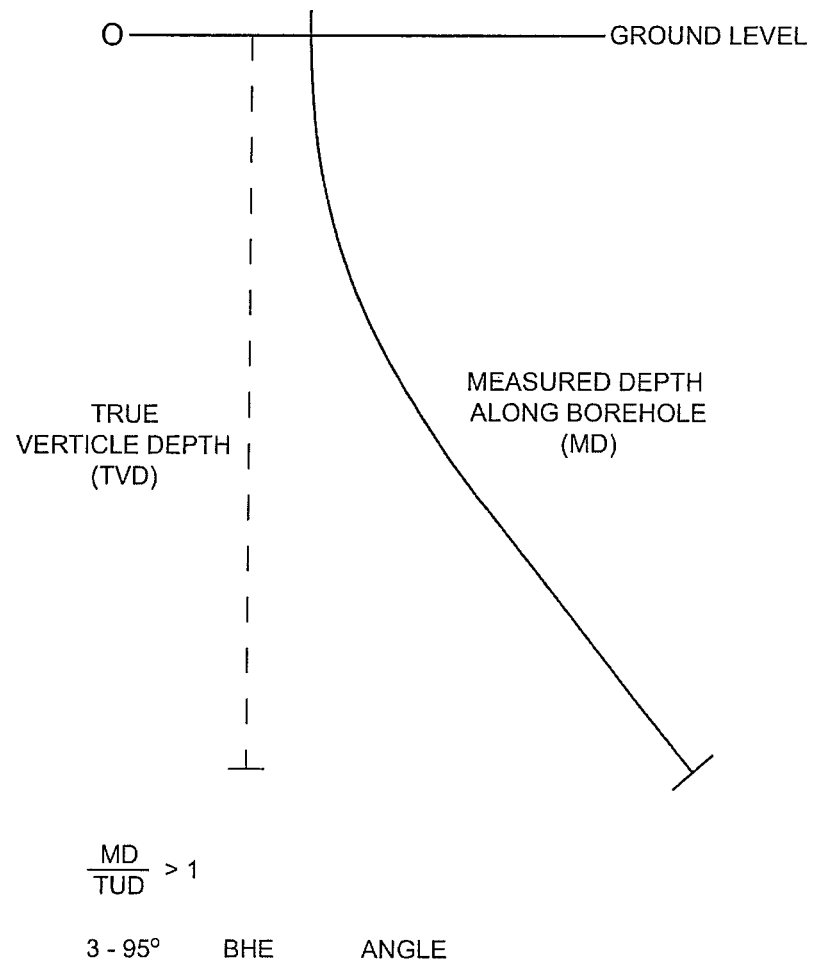
FIG. 9 is a schematic elevational view showing the relationship between the true vertical depth and the measured depth along the borehole of a borehole heat exchanger of the geothermal energy system in accordance with a ninth embodiment of the present invention.

Referring to FIG. 9, there is shown a schematic elevational view showing the relationship between the true vertical depth (TVD) and the measured depth (MD) along the borehole of a borehole heat exchanger of the geothermal energy system in accordance with a ninth embodiment of the present invention. The heat exchanger has a lateral extent, having a horizontal component extending horizontally. Accordingly the ratio, of the measured depth and the true vertical depth, both from the ground level, is greater than 1. The vertical depth of each borehole heat exchanger may be from 5 meters, more preferably from 10 meters, to 750 meters, but typically at least one borehole heat exchanger is at least 100 m in vertical depth. As shown in FIG. 9, the borehole heat exchanger has an average angular inclination, with respect to the vertical, which is from 3 to 95 degrees over the major portion of the borehole heat exchanger, more preferably from 5 to 95 degrees, yet more preferably from 10 to 90 degrees from the vertical, still more preferably from 30 to 60 degrees from the vertical, and most typically about 45 degrees from the vertical. However, any parts of the borehole heat exchanger may range from 3 to 95 degrees from the vertical, in other words may range from just away from the vertical to just above the horizontal. Such a borehole heat exchanger configuration may be used in the other embodiments of the present invention.

Other borehole heat exchanger configurations that may be used in the various other embodiments of the present invention are shown in FIGS. 10 and 11. Such borehole heat exchanger configurations may be formed using well technology known in the oil-well and gas-well drilling industry. Again, any parts of the borehole heat exchanger may range from 3 to 95 degrees from the vertical, in other words may range from just away from the vertical to just above the horizontal.

Referring first to FIG. 10, a first type 152, shown as (a), includes an upper vertical portion 154 extending downwardly from ground level GL, i.e. an angle build section, and a lower constantly inclined portion 156, i.e. an angle hold section, the angle of inclination being preferably from 30 to 60 degrees from the vertical, and most typically about 45 degrees from the vertical. A second type 158, shown as (b), includes an upper vertical portion 160, i.e. an angle build section, and a middle constantly inclined portion 162, i.e. an angle hold section, the angle of inclination being preferably from 30 to 60 degrees from the vertical, and most typically about 45 degrees from the vertical, and a lower vertical portion 164, i.e. an angle drop off section. A third type 166, shown as (c), includes an upper constantly inclined portion 168, i.e. an angle hold section, the angle of inclination being preferably from 30 to 60 degrees from the vertical, and most typically about 45 degrees from the vertical, and a lower horizontal portion 170. A fourth type 172, shown as (d), includes an upper vertical portion 174, i.e. an angle build section, and a lower horizontal portion 176.

Referring second to FIG. 11, a fifth type 178, shown as (e), includes a single constantly inclined portion 180 extending downwardly from ground level GL, the angle of inclination being preferably from 30 to 60 degrees from the vertical, and most typically about 45 degrees from the vertical. A sixth type 182, shown as (f), includes a single vertical portion 184:

For example, the geothermal energy system may comprise a plurality of borehole heat exchangers, at least one first borehole heat exchanger being of the second type 158 and/or sixth type 182 having a major portion thereof extending in a substantially vertical orientation, at least one second borehole heat exchanger being of the third type 166 and/or fourth type 172 having a major portion thereof extending in a substantially horizontal orientation and at least one third borehole heat exchanger being of the first type 152 and/or fifth type 178 having a major portion thereof extending in a substantially inclined orientation, and a manifold (not shown) for the working fluid to which the plurality of borehole heat exchangers is connected. With such an array, the at least one first, second and third borehole heat exchangers may be selectively connected to the manifold by operation of the valves according to a positive or negative heat demand of the building.

Referring to FIGS. 12 and 13, various pad configurations are shown, to which plural borehole heat exchangers are connected. The pad configurations in FIG. 12 are arcuate (a), trapezium (b), and square (c). The pad configurations in FIG. 13 are square (a), cross-like (b), linear (c), arcuate (d), rectangular (e) and circular (f).

Turning to FIG. 14, a central manifold unit 186 is shown, that may be incorporated into the various embodiments of the array of borehole heat exchangers of a geothermal energy system according to the invention. The central manifold unit 186 includes an inlet 188 and an outlet 190 for working fluid that are in use connected to the building heating/cooling system (not shown). The inlet 188 is connected to a series of first inlet valves 192a-i on a first inlet line 194 and a series of second inlet valves 196a-h on a second inlet line 198 parallel to the first inlet line 194. The outlet side of each first inlet valve 192a-i and second inlet valve 196a-h is connected to a respective supply line 197a-i for a respective borehole heat exchanger (in this embodiment there are nine borehole heat exchangers to be connected to the central manifold unit 186). The outlet 190 is connected to a series of outlet valves 198a-i on an outlet line 200. The inlet side of each outlet valve 198a-i is connected to a respective return line 202a-i for a respective borehole heat exchanger. The supply lines 197a-i and the return lines 202a-i selectively supply and return working fluid to and from each respective borehole heat exchanger. However, each borehole heat exchanger may selectively be operated in a reverse flow configuration, in which the functions of the respective supply and return lines are reversed.

Each valve 192, 196, 198 incorporates an actuator (not shown) and may be independently actuated. Accordingly, each borehole heat exchanger of the array can be controlled by the valves of the central manifold unit 186 selectively to drive the respective borehole heat exchanger in a forward or reverse flow configuration. Moreover, each borehole heat exchanger may be connected to any other borehole heat exchanger, or plural borehole heat exchangers, so as to interconnect the borehole heat exchangers in any desired interconnection configuration. Any borehole heat exchanger may selectively be turned off, whereby the selected borehole heat exchanger is bypassed with respect to flow of the working fluid.

FIG. 15 shows in detail the structure of a preferred borehole heat exchanger for use in the various embodiments of the present invention. The borehole heat exchanger 300 is constructed as a co-axial arrangement of outer casing 302 and inner tubing 304 installed in a borehole 306 drilled to the required depth and trajectory. After the outer casing 302 has been lowered into the borehole 306, thermally optimised cement 308 is pumped into the annulus 310 between the outer casing 302 and the borehole wall 312 to ensure structural integrity and hydraulic isolation of the borehole heat exchanger 300 from the geological formations encountered and in particular, isolation from any groundwater zones that may be traversed by the borehole. The bottom 314 of the outer casing 302 is sealed with a bottom plug 316 and cemented to complete this isolation.

The inner tubing 304 is centralised in the outer casing 302 by means of centraliser fins 318 which are located at intervals along the tubing 304 and is left "open-ended" a short distance above the bottom plug 314 so as to establish an efficient, closed-loop path for the circulation of the working fluid (water-based) that acts as the thermal energy transfer medium. These fins 318 also act as mechanical "turbulators" that induce flow characteristics in the borehole heat exchanger annulus 320 between the outer casing 302 and inner tubing 304 that moderately enhance the transfer of geothermal energy to or from the ground formations while minimising pressure losses. Typically, the working fluid is pumped down the annulus 320 (arrow A) and back up the inner tubing 304 (arrow B) to surface under the control of the surface control module although, based upon the precise application, the circulation direction may be reversed in some cases to provide optimum performance.

Temperature sensors, such as 322, may be attached to the borehole heat exchanger 300 at various intervals along the length of the borehole heat exchanger 300.

It is important to note that the efficiency of a borehole heat exchanger is directly related to the temperature difference between the geological formation temperature and the working fluid in the annulus 320 at any point in the borehole heat exchanger. Thus for efficient heat harvesting, the working fluid entering the borehole heat exchanger should be at the lowest possible temperature and the borehole heat exchanger be installed as deeply as practical (e.g. 450 meters) to take advantage of the geothermal gradient. Conversely, for efficient heat rejection in cooling mode, the working fluid should be at the highest practical temperature and the borehole heat exchanger be installed horizontally at a shallow depth (e.g. 50-100 meters).

The borehole heat exchanger design is characterised by the use of precisely selected materials, dimensions and operating parameters, derived from commercially available computer models originally developed for applications in the oil and gas production industry. These models are capable of simulating the thermal response of a co-axial, closed loop circulation system, and specifically the borehole heat exchanger, taking into account all geological, physical, hydraulic and thermal parameters. The outputs from the model include flow rates, pressure losses and thermal response curves (e.g. temperature vs. time) for any specified energy demand profile and so enable the borehole heat exchanger design and operation to be matched precisely to each specific building.

Currently, the outer casing 302 material specified is carbon steel, possessing high thermal conductivity and mechanical strength. The inner tubing 304 is specified as thick-walled thermoplastic, possessing low conductivity to provide thermal isolation and minimise thermal "short-circuiting" of the working fluid that transports the geothermal energy back to surface and thereby increasing the overall thermal efficiency of the borehole heat exchanger 300.

Extensive modelling of numerous BHE configurations using the advanced computer model has confirmed that the thermal power transfer capability of a borehole heat exchanger 300 is significantly higher than has been previously achieved with conventional U-tube borehole heat exchangers to date. For example, average linear power outputs in the range of 80 to 180 W/m are attainable depending upon the demand profile of the building services design. As noted herein, this compares with typical U-Tube or "Slinky" installations that typically deliver 20-70 W/m.

Notwithstanding the high efficiency of the individual borehole heat exchangers in the array, it is important to monitor and regulate the flow rates and temperatures not only to and from the building services connection but also, under certain conditions, between each in order to maximise overall performance and thereby meet the varying energy demands of the building without constraint. This is done by means of the surface control module (SCM), which incorporates the central common manifold unit, mounted on a pad or in a cellar located adjacent to the array at surface. In the case where more than one array installed, there may more than one SCM depending upon the overall design requirements.

Referring to FIG. 16, within the surface control module 400 are mounted, as part of or connected to the central manifold unit 401, valves 402, pressure gauges 404, sensors 406 and flow sensors 408 which are controlled by a microprocessor 410 programmed to maintain the optimum energy balance of the array 412 of borehole heat exchangers affixed to the pad 413 and to deliver working fluid at the required temperature to the building services installation 418. A pump 419 is provided for pumping the working fluid through the array 412 of borehole heat exchangers, the pump 419 typically being located in the building services installation 418. In addition, the thermal energy delivered to the building services will be metered by a meter 420 at the output of the surface control module 400. Software is installed in the microprocessor 410 which maps the response of the array 412 to varying building energy demand and which is compatible with the building management system 422. This software may be modified and re-installed should the demand profile change or in order to implement upgrades.

During the operation of the installation, working fluid at the required temperature at any given moment in time, will be available at the output of the surface control module 400. This working fluid then has to be delivered to the plant room 424 where the primary heat pump units 426 are installed, usually located in the basement of the building. At the same time, expended working fluid arriving at the output of the plant room 424 has to be returned to the surface control module 400 for re-injection back into the array 412. This task is performed by a network of pre-insulated thermoplastic pipes that are typically buried 1-2 meters below ground level and which ensure minimum thermal and hydraulic energy losses during the transfer process.

The building services installation 418 ideally takes into consideration many factors in the design, aimed at combining state of the art energy efficient construction techniques and renewable energy sources with the aim of meeting or, if so desired, exceeding in a cost effective manner, the increasingly stringent carbon emission reduction targets set by local and national authorities. At the same time, the objective of maintaining an all year round comfortable environment inside the building and providing the requisite supply of hot water is of course a primary design goal.

The thermal response curve (output temperature vs time) of any given single borehole heat exchanger installed apparatus, assuming all other related variables such as borehole heat exchanger thermal resistance, ground formation lithology and ground formation thermal properties being constant, is a function of the working fluid flow rate, working fluid input temperature and working fluid operating cycle (duration and frequency of time "on" versus time "off" periods over a given period of time). The thermal response curve can therefore be modified by changing one or more of the following parameters i.e. working fluid flow rate and flow direction, input temperature and operating cycle to shape the thermal response curve of the borehole heat exchanger. Furthermore, the thermal response curve of a plurality of borehole heat exchangers can be combined and modified by selective distribution of working fluid within the plurality of borehole heat exchangers.

The thermal response curve of each borehole heat exchanger or plurality of borehole heat exchangers may be mapped over the operating range of working fluid flow rate (0-10 liters/sec), flow direction (forward or reverse) and input temperature (−10 to +40 deg. C.) envisaged. This is initially done by computer-aided analysis and prediction and subsequently refined by empirical data obtained during operation.

A surface control module (SCM) intrinsic to the manifold contains a programmable computer module, sensors and control valves to monitor and control all working fluid flow rates, flow directions, temperatures and pressures for each borehole heat exchanger as well as throughout the complete system including for the monitoring and control of the primary working fluid inlet and outlet flows from the surface control module to the serviced building.

Optionally, temperature sensors attached to the borehole heat exchanger at various intervals along the length of the borehole heat exchanger may be used to supplement the monitoring and control of the borehole heat exchanger thermal response curve.

The thermal energy demand profile of any given building over time is a function of multiple variables including physical location, size, construction method and material, occupancy rate and pattern, internal equipment installations and external climatic conditions among others. The internal climate control is managed by a building services management (BSM) system that varies in degree of complexity from simple thermostatic control to computer-aided control of multiple valves and sensors according to the design of the space heating and cooling and hot water system installed in the building.

The thermal energy demand profile of any given building at chosen intervals over time can be mapped in accordance with the planned operating conditions. This is initially done by computer-aided analysis and prediction and subsequently refined by empirical data obtained during operation.

The variable thermal energy demand of the building services management system at any point in time is met overall by incorporating the mapped thermal energy demand profile of the building with the mapped borehole heat exchanger thermal energy response curves to match them as closely as possible over time. This function is carried out by the computer module, i.e. the microprocessor, within the surface control module. In addition, the computer module, can also monitor any irregular real-time fluctuations of thermal energy demand from the building and adjust the BHE thermal energy response to best meet these irregular fluctuations.

When considering the application of the geothermal energy system of the present invention to a new building, as noted above, it is important to select the building services technologies so as to optimise the fundamental operating capability of geothermal energy system as well as the performance of the building services installation. For example, some direct heating or cooling designs are not well suited for connection to a geothermal energy system since they function with small temperature differentials between inlet and outlet connections. The efficiency of any borehole heat exchanger in a geothermal energy system is a function of the difference between the ground temperature and the temperature of the working fluid at any point along the borehole heat exchanger. However, heat pump based installations, by interfacing between the building treated areas and the borehole heat exchanger, enable the borehole heat exchanger to operate in the optimum temperature range, thereby maximising its efficiency in both heating and cooling modes.

A number of HVAC building services designs are now commercially available which are not only engineered to provide primary space heating and cooling directly but are also capable of heat distribution management between different parts of the same building and thereby greatly improving efficiency and reducing the magnitude and duration of demand swings on borehole heat exchangers of the geothermal energy system. This has benefits in terms of both reduced specification and therefore cost of the geothermal energy system installation with the added benefit of lower running cost. Furthermore, if combined with state of the art energy saving construction methods, a further significant reduction of the carbon footprint can be realised.

The building services design is undertaken using the latest computer-aided design tools including software that enables a holistic approach to satisfying the space heating and cooling requirements taking into account the response of the structure to the outside environment as well as the internally generated energy demand profile.

As shown in the foregoing embodiments, each rigid concrete pad contains multiple "wellheads" connecting to the borehole heat exchangers, typically between 5 and 10 per pad, and typically spaced 3 meters or less apart. The pad acts as the surface termination junction of each borehole heat exchanger to a surface control module "SCM" that monitors and regulates the temperatures, pressures and flows of the water-based working fluid by pumping the fluid through and/or between the borehole heat exchangers under computer control so as to optimise the thermal energy input/output of the array(s) to the building energy demand profile at any point in time. This process may be facilitated by the provision of integral temperature and flow sensors located at intervals along the length of each borehole heat exchanger to monitor the performance and integrity of the borehole heat exchanger at all times.

The SCM is also linked electronically to a building services management (BSM) system that controls the heating, ventilation and air-conditioning (HVAC) climate control and hot water heating facilities in the serviced building. Under SCM control, the working fluid flows through and between the various borehole heat exchangers in the array(s) can be operated in a time and temperature dependent manner (cycling) rather than in a continuous or simple on/off manner. In conjunction with precise design of the borehole heat exchangers, this results in precise matching over time of the building energy requirements with the thermal energy capacity of the borehole heat exchanger array(s) being achieved, and eliminates the possibility of thermal depletion or saturation of the ground formations and hence any consequent system efficiency degradation.

A further operating variant is to switch the SCM to standby mode whereby one or more borehole heat exchangers are operated in a thermosyphon-driven mode for the purposes of optimising the temperature of the ground formations without need for external pumping power.

This integrated electronic system, of the surface control module and the building services management system, i.e. (SCM+BSM) provides the option to automate the daily operation of the system with local supervision or alternatively to provide for remote system operation and supervision via hard wire or wireless telecommunications. The wellhead pads and surface control module may be constructed as a surface mounted module or in a cellar below ground level.

The boreholes are drilled using a customised, automated mobile drilling rig which may be equipped with a slant drilling capability. This is operated in conjunction with established equipment and techniques sourced from the oil and gas industry such as measurement-while-drilling sondes (MWD), steerable hydraulic motors and/or steerable rotary drilling systems, downhole hydraulic motors, directional air hammers, gyroscopic and inertial guidance systems and associated control software so as to drill an array of boreholes starting from a concrete pad a few meters square in area within which the wellheads will be spaced 3 meters or less at surface but which may be drilled directionally to achieve wide separation of up to hundreds of meters at the final depth. The drilling process may be facilitated by the use of non-toxic "drilling fluids" including water-based fluids, foam or air depending upon the application.

Each borehole heat exchanger consists of a co-axial "tube-in-tube" arrangement which is mechanically and hydraulically isolated from the ground formations traversed by the containing borehole. The outer casing may be constructed from steel, aluminium, polyvinyl chloride (PVC), glass reinforced plastic (GRP) or carbon reinforced plastic (CRP) according to the application. The outer casing may be cemented partially, wholly or not at all within the containing borehole depending upon the nature of the ground formations being traversed. The cement formulation may include traditional cement-based grouting or alternatively swellable sealing compounds according to the application.

Within the outer casing is installed a thick-walled or pre-insulated tubing made of PVC, GRP or CRP composite material or alternatively steel or aluminium encased in an insulating sleeve. According to type and application, this tubing may be delivered and installed as a continuous coil or in discrete lengths that are then mechanically joined together. This tubing is centralised in the bore of the outer casing by angled centralising "deflectors" that provide the necessary cross-sectional area clearance between the outer casing and the inner tubing as well as providing improved heat transfer from the outer casing to the working fluid by the resultant "swirling" action.

The working fluid path is confined within the borehole heat exchanger by a mechanical plug which is permanently installed at the bottom of the outer casing such that closed-circuit flow is established either down the annulus between the outer casing and inner tubing and up the inner tubing (reverse circulation) or vice-versa (forward circulation). This closed-circuit method ensures that the working fluid at no time in operation comes into contact with ground formations or associated liquid accumulations, typically aquifers thus making the system environmentally friendly.

The present inventors, following further studies of deep thermosyphonic activity based upon a computer model, came to the realisation that commercial sized building power requirements for cooling were significantly larger than for heating in the UK environment. The conclusion drawn from this was that heat rejection into the ground was at least as important as heat extraction in satisfying a buildings' space heating and cooling requirements, particularly applications for space heating and cooling for commercial sized buildings. There are increasing international concerns with global warming and in particular as regards emissions of greenhouse gases such as carbon dioxide generated by human activity. Geothermal energy, either for the purposes of space heating and/or cooling or for the generation of electric power, offers a renewable, low carbon alternative to fossil fuelled energy systems.

In one aspect of the present invention, in order to maximise cooling efficiency in a cooling-mode, some borehole heat exchangers (BHE) are located at shallower depths than employed in a heating-only mode. The working fluid needs to be pumped around the system in cooling mode, since thermosyphonic action would actually act against the direction of flow required. The shallower depths are required since the temperature of the ground formations increases near-linearly with depth across the globe except in certain anomalous areas e.g. areas of volcanic activity. For maximum heat rejection efficiency in cooling mode, the temperature difference between the hot working fluid and the ground formation at any point along the borehole heat exchanger should be maximised, hence the prescribed shallow depth. It was also found that the direction of circulation of working fluid in the borehole heat exchanger would have an impact on thermal efficiency, especially in the cooling mode where "reverse" circulation down the annulus and up the concentric inner tube of the BHE would have a positive benefit.

Accordingly, in some embodiments the boreholes in which the coaxial borehole heat exchangers are installed are directionally drilled so as to maintain sufficient length of borehole heat exchangers while keeping the overall depth minimised. This may be achieved by selection of a suitable trajectory for the borehole from vertical, through inclined, to horizontal according to the application.

In the preferred embodiments of the present invention, there is the concept of directional drilling of the borehole heat exchangers using oil and gas drilling practice by drilling an "array" of boreholes of varying trajectory from a small concrete "pad" at the ground surface within which the surface terminations ("Wellheads") of the boreholes are closely spaced, usually only by a distance of three meters or less. The drilling may be performed by a conventional, lightweight mobile rig. This is in direct contrast to the current standard practice of either drilling tens or hundreds of shallow (e.g. 100 m) boreholes ("U-tubes") or installing kilometers of plastic piping in shallow (2 m) trenches ("Slinkies") over hundreds of square meters. The cost, inconvenience and reduction of useable land area caused by the current practice, has acted as a barrier to the growth of geothermal energy applications in the UK in particular. In contrast, the pad drilling approach has many advantages including a small surface footprint of a 10-20 square meters as well as the capability to install long lengths of borehole with no disturbance of the adjacent site surface.

A study was made of a generic office building (in the UK) whereby the building heating and cooling energy profile would be matched to an array of borehole heat exchangers capable of providing both heating and cooling energy. These studies confirmed the dominance of cooling energy requirement over heating energy requirement.

In the preferred embodiments of the present invention, the surface connections of each borehole heat exchanger are assembled together in an array having a small footprint together by a surface control module that contains the necessary valves and sensors that enable computer control of the flow conditions through each borehole heat exchanger, between each borehole heat exchanger, and between the borehole heat exchanger array and the building(s) served. This can not only optimise the energy balance of the whole array but would also lead to sustaining varying loads from the building without depleting or saturating the ground thermal environment. Furthermore, the surface control unit would enable the simultaneous supply of heating and cooling energy to the served building(s).

Computer modelling has demonstrated the response of a range of different borehole heat exchangers over different flow rate and operating temperature ranges. The results confirmed that the expected impacts of depth, trajectory, borehole heat exchanger diameter, flow rate, flow direction, ground temperature, casing and tubing materials and mode of operation were as expected. Also important was the revelation that by altering the on-off cycling periods of circulation, higher efficiency and peak power outputs could be realised, this enhancing the compatibility of the borehole heat exchangers to the building energy demand profile. Furthermore, it was noted that under certain conditions, the low carbon emissions performance of the borehole heat exchanger array could be enhanced and the versatility of the array increased by combining it with other renewable technologies, such as combined heat and power (CHP) to deal more effectively with peak power demands and to further reduce the carbon footprint of the installation.

By design, the borehole heat exchanger array thermal power output curves are matched to the building thermal power demand curves re space heating, cooling and hot water supply.

In accordance with preferred aspects of the invention, the thermal energy management of individual buildings to can be extended to the thermal energy management of multiple buildings and facilities and to the incorporation of a variety of thermal sources and storage resources. The surface control module is a central component of such a multiple-component system.

Energy efficiency is a contributor to the reduction of global carbon dioxide emissions. The present invention can provide large scale, high efficiency space heating and cooling installations based upon existing and well proven ground source heat pump practice. The borehole heat exchangers can be installed by the adaptation of advanced, technically and commercially proven oilfield wellbore drilling and completion technologies that have been employed both onshore and offshore for many years. The principal advantage is to cost-effectively construct an array of boreholes that will be completed with a highly efficient co-axial, closed loop heat exchanger design that will serve a matched building services design from a small location or pad adjacent to the relevant building.

The geothermal energy system of the preferred embodiments of the present invention is an integrated, customised, energy-efficient and low-carbon emission system that provides space heating and/or cooling energy principally to large-scale building structures or any building with a high demand in heating and/or cooling. The energy provided by geothermal energy system is derived largely from globally abundant, low temperature geothermal sources that are both sustainable and renewable and provide the means to achieve very significant reductions in the carbon footprint of the serviced buildings.

There is also provided, in the preferred embodiments of the present invention, a highly efficient and practical geothermal borehole heat exchanger array coupled to a surface control module and energy delivery network capable of delivering or storing large quantities of thermal energy in combination with the most advanced ground source heat pump technology and best practice in design methods and materials in the building services industry.

The preferred embodiments of the present invention can provide a compact array of borehole heat exchangers consisting of multiple, directionally drilled and specially equipped geothermal boreholes, specifically designed for maximum efficiency under the thermal loads envisaged and for precise matching to the building services design. The preferred embodiments of the present invention can provide a microprocessor surface control module "SCM" interface unit that manages the transfer of geothermal energy to or from the building services installation and between the individual borehole heat exchangers in the array.

The preferred embodiments of the present invention can provide a low pressure, thermally insulated, energy distribution network linking the SCM to the building services installation.

The preferred embodiments of the present invention can provide a purpose designed and constructed building services installation, incorporating advanced heat pump technology for heating and/or cooling of treated areas and provision of hot water within the building.

One or more separate arrays may be installed at a given site depending upon the size of the development and the energy demand profile.

An important consideration in the design of a geothermal energy system installation is the balance of demand from the building services installation between heating and cooling, which has a direct influence on whether the borehole heat exchangers are constructed vertically, inclined or even horizontally under the permitted area of the property development. If heating is the primary consideration, then a vertical borehole heat exchanger would be prescribed. Conversely, if cooling is the primary consideration, then a horizontal borehole heat exchanger would deliver the optimum performance. In practice, the geothermal energy system installation of the present invention would typically include numbers of vertical, inclined and horizontal borehole heat exchangers drilled from one or more pads from which the borehole heat exchangers would be constructed in a pattern akin to the root system of a tree but which in this case is designed to harvest or store thermal energy in the ground formations penetrated.

Furthermore, it is of importance to integrate the design of the borehole heat exchanger array with the building services design and its energy profile, to avoid the inefficiencies that have typically resulted from mismatched equipment in the past when ground source heat pump installations have been prescribed. The objective is to leverage off the respective technologies employed by ensuring that, as far as possible, the technology employed in the building services installation is matched to the performance capabilities of the borehole heat exchanger array as well as providing the most efficient performance in delivering heating and cooling to the building services design.

In accordance with preferred embodiments of the present invention therefore, a compact surface pad is provided to extend the coaxial borehole heat exchangers beyond the surface boundaries of the pad. Directional drilling techniques, typically found in oil and gas field development practice, are employed as a practical solution to install the coaxial borehole heat exchangers, and to install each coaxial borehole heat exchanger to the required degree of depth, angle and azimuth. The installed coaxial borehole heat exchangers can be free of thermal interference factor, except typically for the topmost 20-30 meters of the coaxial borehole heat exchangers, which is typically less than 5% of the total length for each BHE, and also less than the total length of each cluster of coaxial borehole heat exchangers. By providing a three dimensional array, multiple heat transfer processes throughout a large volume can be achieved from one point, the pad, at the ground surface. This may be contrasted with a single dimension heat transfer process for known vertical borehole heat exchangers. By providing a pad, there is no need for an extensive collector system at the ground surface, and this achieves an ultra high density output/input of thermal energy per surface pad. The pad can be located next to a building or directly under the utility room or any other part of a building in the case of a newly constructed building. There are only limited or even substantially no operating losses as a result of the distance between the borehole heat exchangers and the building. By providing multiple depth borehole heat exchangers any or all of heating, hot water services and/or simultaneous cooling can be provided from a single pad and surface control module, or one operating mode can be selected. The coaxial borehole heat exchangers of the array can be managed collectively or independently. It is possible to provide re-circulation of working fluid between the borehole heat exchangers of the array to re-charge or release excessive thermal energy to provide ideal temperature gradient/s for each type of heating or cooling operation.

The directional drilling provides an option to choose selected trajectory(ies) and depth(s) to locate each coaxial borehole heat exchangers within a rock formation having a quality providing the best thermal conductivity for effective harvesting or injection of thermal energy. The directional drilling can utilise rock fraction orientation to reduce the drilling cost or to improve thermal energy transfer. It is possible to maximise the aquifer flow effect using a close borehole heat exchanger without impact on natural resources. Furthermore, it is possible to go around or indeed through a borehole heat exchanger array of a neighbouring building at a safe distance without causing thermal interference.

An extended coaxial borehole heat exchanger array can have a geometry that allows effective use of internal thermosyphonic flows within one or more closed circuits between one or plural borehole heat exchangers for re-distribution of heat energy along the length of one, or several, or all borehole heat exchangers located at one pad. This can save running costs related to circulation energy losses, by lowering the pumping demand, and can lower the thermal energy required by the heat pump plant.

The use of thermosyphonic circular flow, that is buoyancy flow driven by changes in the working fluid density affected by a thermal energy temperature gradient, is known for borehole heat exchangers. However, for a number of reasons, including the limitation of extensive surface collector systems, there was a barrier against the use of complex interacting flows between separate but connected ground heat exchangers located to different depths and temperature gradients under controlled trajectories. However, the system of the preferred embodiments of the present invention is capable of effective utilisation of these flows as a system or in a single vertical, directional or horizontal (e.g. L shaped) borehole heat exchanger.

The preferred embodiments of the present invention provide an apparatus for extracting or injection of a large amount thermal energy from a single compact pad or multiple compact pads in which an array of borehole heat exchanger, which are preferably coaxial, extend beyond the ground surface point to serve heat pump plants of industrial size and capacity. There can be provided an apparatus for the management of an array of borehole heat exchangers as one unit, or as individual units in individual modes, or in any proportion between the whole array or one single borehole heat exchanger via a head control unit, consisting of a series of valves and gauges within a compact manifold unit. The user interface can be attached to the head control unit of an array, or detached from but linked to a head control unit of an array for operation from adjacent building. By utilising the 3D volume of strata under a predetermined area defined by surface boundaries, a heat energy sink or source or store can be provided in abundance, and having a capability to match any given consumer requirements of the building. The array can comprise a plurality of directionally drilled borehole heat exchangers, each of a prescribed depth, angle and azimuth. The system can have a single or multiple compact pads in different forms of clusters e.g. circular, rectangular, arc, square and straight line or any combination of these forms for adjacent clusters. The array can have a combination of multiple or single directional, horizontal and vertical coaxial borehole heat exchangers within single or multiple arrays. The pad constitutes a compact collector system allowing transmission of high density thermal energy per unit of surface space, thereby reducing working fluid pressure and thermal losses. The surface location of the pad is adjacent to or remote from the building or facility, or located under any part of the building or facility, with the borehole heat exchanger array spread beyond such surface location to any side or depth. Multiple borehole heat exchangers can be used in different modes depending on the season, climate and the building's energy profile. The system is capable of supplying, absorbing or storing thermal energy at different depths or causing forced re-circulation between multiple depths and/or external thermal gradients. Additionally, the system can re-distribute thermal energy between parts of an array by means of thermosyphonic flows to improve an uptake efficiency by the heat pump plant. The directional drilling is capable of full utilisation of selected horizons consisting of preferable quality rock strata by following a given pattern of the rock formations, full utilisation of aquifer flows by following a given pattern of aquifers, and sinking a horizontal part of the closed circuit borehole heat exchanger to gain or reject thermal energy at premium rates, and also full utilisation of rock fracture orientation through following or crossing a given pattern of fractures to achieve premium rates in thermal conductivity. The laying of an array of borehole heat exchangers upon individual strata settings can be carried out to achieve optimum thermal efficiency for the given ground volume. By operating with a selected number of borehole heat exchangers based on a current thermal gradient, this permits switching off of the rest of an array from forced circulation, with an option for passive redistribution of thermal energy between selected stand-by borehole heat exchangers.

The key to the cost-effective installation of the borehole heat exchanger array is the concept of combining advanced oil and gas drilling and completion technologies and adapting them to the shallower environment typical of geothermal exploitation. A combination of this technology and associated techniques with materials specified precisely to match the relatively benign geological environment allows construction of multiple boreholes along any desired trajectory and to the prescribed depth, from a compact surface location in an entirely self-contained manner. This is a key advantage when considering projects in the urban environment or where surface area is limited.

The embodiments of the present invention described herein are purely illustrative and do not limit the scope of the claims. Features disclosed with respect to one embodiment may be combined with features of any other embodiment and be within the scope of the invention claimed.

The invention claimed is:

1. A geothermal energy system comprising:
    a plurality of borehole heat exchangers, each borehole heat exchanger containing a working fluid and comprising:
        an elongate tube having a closed bottom end, and
        first and second adjacent elongate coaxial conduits interconnected at the bottom end, the first conduit being tubular and surrounded by the second conduit which is annular;

a plurality of valves connected to the plurality of borehole heat exchangers, the plurality of valves being within a manifold;

a pump for pumping the working fluid through the borehole heat exchangers; and wherein the valves and pump are arranged for selectively pumping the working fluid through a selected one or more of the borehole heat exchangers in a respective direction selected from a first direction and an opposite second direction with respect to the respective first and second conduits of the respective borehole heat exchanger, each of the first and second conduits is connected to respective valves of the plurality of valves within the manifold wherein each of the plurality of borehole heat exchangers is selectively connectable to any other of the plurality of borehole heat exchangers.

2. A geothermal energy system according to claim 1 wherein the plurality of borehole heat exchangers extends downwardly and laterally into the ground from a central surface assembly of the elongate tubes to define a ground volume of the geothermal energy system which encloses the plurality of borehole heat exchangers, and wherein a footprint area of the central surface assembly is less than 10% of a footprint area of the ground volume of the geothermal energy system.

3. A geothermal energy system according to claim 2 wherein the footprint area of the central surface assembly is less than 5% of a footprint area of the ground volume of the geothermal energy system.

4. A geothermal energy system according to claim 1 further comprising a control module connected to the plurality of borehole heat exchangers for controlling the pump and the valves for selectively distributing the working fluid within the plurality of borehole heat exchangers to achieve a particular thermal energy output profile.

5. A geothermal energy system according to claim 4 which is connected to a building and wherein the control module is adapted to control the thermal energy supply to or from the building in response to a thermal energy demand profile from a building energy management system of the building.

6. A geothermal energy system according to claim 1 wherein at least one first borehole heat exchanger has a major portion thereof extending in a substantially vertical orientation, at least one second borehole heat exchanger has a major portion thereof extending in a substantially horizontal orientation and at least one third borehole heat exchanger has a major portion thereof extending in a substantially inclined orientation.

7. A geothermal energy system according to claim 1 wherein at least one of the borehole heat exchangers has an average inclination with respect to the vertical of from 3 to 95 degrees.

8. A geothermal energy system according to claim 7 wherein at least one of the borehole heat exchangers has a major portion thereof with an average inclination with respect to the vertical of from 30 to 60 degrees.

9. A geothermal energy system according to claim 8 wherein the at least one borehole heat exchanger has a major portion thereof with an average inclination with respect to the vertical of 45 degrees.

10. A geothermal energy system according to claim 1 wherein the valves and pump are arranged for selectively pumping the working fluid through a selected one or more of first borehole heat exchangers in a respective selected forward direction down the second conduit and up the first conduit and simultaneously through a selected one or more second borehole heat exchangers in a respective selected reverse direction down the first conduit and up the second conduit.

11. A geothermal energy system according to claim 1 further comprising integral temperature and flow sensors located at intervals along the length of each borehole heat exchanger.

12. A method of operating a geothermal energy system comprising a plurality of borehole heat exchangers, each borehole heat exchanger containing a working fluid and comprising an elongate tube having a closed bottom end and first and second adjacent elongate coaxial conduits interconnected at the bottom end, the first conduit being tubular and surrounded by the second conduit which is annular, a plurality of valves connected to the plurality of borehole heat exchangers, the plurality of valves being within a manifold, and a pump for pumping the working fluid through the borehole heat exchangers; the method including the step of: selectively pumping the working fluid through a selected one or more of the borehole heat exchangers in a respective direction selected from a first direction and an opposite second direction with respect to the respective first and second conduits of the respective borehole heat exchanger, each of the first and second conduits connected to respective valves of the plurality of valves within the manifold wherein each of the plurality of borehole heat exchangers is selectively connectable to any other of the plurality of borehole heat exchangers.

13. A method according to claim 12 wherein the plurality of borehole heat exchangers extends downwardly and laterally into the ground from a central surface assembly of the elongate tubes to define a ground volume of the geothermal energy system which encloses the plurality of borehole heat exchangers, and wherein a footprint area of the central surface assembly is less than 5% of a footprint area of the ground volume of the geothermal energy system.

14. A method according to claim 12 wherein a control module is connected to the plurality of borehole heat exchangers for controlling the pump and the valves for selectively distributing the working fluid within the plurality of borehole heat exchangers to achieve a particular thermal energy output profile.

15. A method according to claim 14 wherein the control module is adapted to control the thermal energy supply to or from a building in response to a thermal energy demand profile from a building management system of the building.

16. A method according to claim 12 wherein at least one first borehole heat exchanger has a major portion thereof extending in a substantially vertical orientation, at least one second borehole heat exchanger has a major portion thereof extending in a substantially horizontal orientation and at least one third borehole heat exchanger has a major portion thereof extending in a substantially inclined orientation.

17. A method according to claim 12 wherein at least one of the borehole heat exchangers has an average inclination with respect to the vertical of from 3 to 95 degrees.

18. A method according to claim 17 wherein at least one of the borehole heat exchangers has a major portion thereof with an average inclination with respect to the vertical of from 30 to 60 degrees.

19. A method according to claim 18 wherein the at least one borehole heat exchanger has a major portion thereof with an average inclination with respect to the vertical of 45 degrees.

20. A method according to claim 12 wherein the valves and pump selectively pump the working fluid through a selected one or more of first borehole heat exchangers in a respective selected forward direction down the second conduit and up the first conduit and simultaneously through a selected one or more second borehole heat exchangers in a respective selected reverse direction down the first conduit and up the second conduit.

21. A method according to claim 12 further comprising monitoring the temperature and flow at intervals along the length of each borehole heat exchanger.

22. A geothermal energy system comprising a plurality of borehole heat exchangers coupled to a heat pump and/or cooling system of a building, each borehole heat exchanger containing a working fluid, and a pump for selectively pumping the working fluid through the borehole heat exchangers, each borehole heat exchanger comprising an elongate tube having a closed bottom end, the elongate tube having a steel outer casing and a thermoplastic inner tubing within the outer casing which define first and second adjacent elongate conduits interconnected at the bottom end, the first conduit being tubular and surrounded by the second conduit which is annular, wherein the plurality of borehole heat exchangers extends downwardly and laterally into the ground from a central surface assembly of the elongate tubes to define a ground volume of the geothermal energy system which encloses the plurality of borehole heat exchangers, each of the first and second conduits is connected to valves within a manifold wherein each of the plurality of borehole heat exchangers is selectively connectable to any other of the plurality of borehole heat exchangers, wherein a footprint area of the central surface assembly is less than 10% of a footprint area of the ground volume of the geothermal energy system, the vertical depth of at least one of the plurality of borehole heat exchangers is at least 100 meters, and the majority of the length of each of the borehole heat exchangers is mutually separated from other borehole heat exchangers so as to be substantially thermally independent therefrom.

23. A geothermal energy system according to claim 22 wherein a footprint area of the central surface assembly is less than 5% of a footprint area of the ground volume of the geothermal energy system.

24. A geothermal energy system according to claim 23 wherein the footprint area of the central surface assembly is less than 1% of a footprint area of the ground volume of the geothermal energy system.

25. A geothermal energy system according to claim 22 wherein the central surface assembly comprises a rigid structure to which the upper ends of the borehole heat exchangers are affixed.

26. A geothermal energy system according to claim 25 wherein the rigid structure comprises concrete to which the upper ends of the borehole heat exchangers are affixed.

27. A geothermal energy system according to claim 22 wherein at least one first borehole heat exchanger has a major portion thereof extending in a substantially vertical orientation, at least one second borehole heat exchanger has a major portion thereof extending in a substantially horizontal orientation and at least one third borehole heat exchanger has a major portion thereof extending in a substantially inclined orientation.

28. A geothermal energy system according to claim 22 wherein at least one of the borehole heat exchangers has an average inclination with respect to the vertical of from 3 to 95 degrees.

29. A geothermal energy system according to claim 28 wherein at least one of the borehole heat exchangers has a major portion thereof with an average inclination with respect to the vertical of from 30 to 60 degrees.

30. A geothermal energy system according to claim 29 wherein the at least one borehole heat exchanger has a major portion thereof with an average inclination with respect to the vertical of 45 degrees.

31. A geothermal energy system according to claim 22 wherein an upper portion of each borehole heat exchanger extends substantially vertically downwardly from the central surface assembly.

32. A geothermal energy system according to claim 22 wherein the majority of the length of each of the borehole heat exchangers is mutually separated from other borehole heat exchangers by a distance of at least 4 meters.

33. A geothermal energy system according to claim 22 wherein at least one of the plurality of borehole heat exchangers includes plural portions of mutually varying length and inclination.

34. A geothermal energy system according to claim 22 wherein the plurality of borehole heat exchangers is directionally drilled from a surface pad.

35. A geothermal energy system according to claim 34 wherein the surface pad has a surface area of from 10 to 20 square meters.

36. A geothermal energy system according to claim 22 wherein the outer casing is cemented within a borehole.

37. A geothermal energy system according to claim 22 wherein the inner tubing is composed of PVC.

* * * * *

UNITED STATES PATENT AND TRADEMARK OFFICE
CERTIFICATE OF CORRECTION

| | |
|---|---|
| PATENT NO. | : 9,556,856 B2 |
| APPLICATION NO. | : 12/452559 |
| DATED | : January 31, 2017 |
| INVENTOR(S) | : James J. Stewart et al. |

Page 1 of 1

It is certified that error appears in the above-identified patent and that said Letters Patent is hereby corrected as shown below:

On the Title Page

Under item (73) Assignee:
please delete: "NJ (US)"
and insert -- Jersey --.

Signed and Sealed this
Twenty-eighth Day of March, 2017

Michelle K. Lee
*Director of the United States Patent and Trademark Office*